(12) United States Patent
Hayashi et al.

(10) Patent No.: US 7,277,502 B2
(45) Date of Patent: Oct. 2, 2007

(54) CARRIER RECOVERY APPARATUS

(75) Inventors: Yoshikazu Hayashi, Ibaraki (JP); Takaaki Konishi, Ibaraki (JP); Teruaki Hasegawa, Nagaokakyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 484 days.

(21) Appl. No.: 10/505,926

(22) PCT Filed: Mar. 10, 2003

(86) PCT No.: PCT/JP03/02807

§ 371 (c)(1),
(2), (4) Date: Aug. 27, 2004

(87) PCT Pub. No.: WO03/077497

PCT Pub. Date: Sep. 18, 2003

(65) Prior Publication Data

US 2005/0207514 A1 Sep. 22, 2005

(30) Foreign Application Priority Data

Mar. 11, 2002 (JP) ............................. 2002-064880
Oct. 30, 2002 (JP) ............................. 2002-315687

(51) Int. Cl.
*H04L 27/00* (2006.01)

(52) U.S. Cl. ...................... 375/326; 375/327; 375/376; 327/147; 329/307

(58) Field of Classification Search ........ 375/324–327, 375/340, 343, 371, 375–376
See application file for complete search history.

(56) References Cited

U.S. PATENT DOCUMENTS 4,648,100 A * 3/1987 Mardirosian ................ 375/332

(Continued)

FOREIGN PATENT DOCUMENTS

JP 57-131151 A 8/1982

(Continued)

OTHER PUBLICATIONS

International Search Report for application No. PCT/JP03/02807 dated Apr. 30, 2003.

(Continued)

*Primary Examiner*—Mohammed Ghayour
*Assistant Examiner*—Nurul M Matin
(74) *Attorney, Agent, or Firm*—RatnerPrestia

(57) ABSTRACT

A carrier recovery apparatus capable of detecting a phase error of modulation signal by a simple calculation, reducing the circuit scale, and improving the frequency capture characteristic and phase jitter characteristic is presented. This carrier recovery apparatus comprises a symbol estimating unit for estimating the transmitted symbol, a phase error detector for generating a normalized phase error signal on the basis of the estimated symbol and reception signal, a loop filter for filtering the phase error, and a numerical control oscillator controlled by the loop filter.

18 Claims, 19 Drawing Sheets

U.S. PATENT DOCUMENTS

| | | | |
|---|---|---|---|
| 5,832,040 A * | 11/1998 | Yamanaka et al. | 375/326 |
| 5,838,738 A * | 11/1998 | Zook | 375/340 |
| 5,872,812 A | 2/1999 | Saito et al. | |
| 5,920,228 A * | 7/1999 | Soga et al. | 329/304 |
| 5,940,450 A * | 8/1999 | Koslov et al. | 375/344 |
| 6,307,898 B1 * | 10/2001 | Ido | 375/326 |

FOREIGN PATENT DOCUMENTS

| | | |
|---|---|---|
| JP | 61-225951 A | 10/1986 |
| JP | 01-093241 A | 4/1989 |
| JP | 01-204525 A | 8/1989 |
| JP | 03-034746 A | 2/1991 |
| JP | 08-149174 A | 6/1996 |
| JP | 09-214578 A | 8/1997 |
| JP | 10-243042 A | 9/1998 |
| JP | 10-322409 A | 12/1998 |
| JP | 2000-069104 A | 3/2000 |
| JP | 2000-286916 A | 10/2000 |

OTHER PUBLICATIONS

Taga, N., et al., A Study of QPSK Demodulation System, ITEJ Technical Report, vol. 15, No. 46, CE' 91-42 (Aug. 1991), pp. 19-24 (with partial English translation).

* cited by examiner

| Address (Di,Dq) | ROM data |
|---|---|
| (1,1) | 9 |
| (1,3) | 9/5 |
| (3,1) | 9/5 |
| (3,3) | 1 |

| Address (Di,Dq) | ROM data |
|---|---|
| (1,1) | 1/9 |
| (1,3) | 5/9 |
| (3,1) | 5/9 |
| (3,3) | 1 |

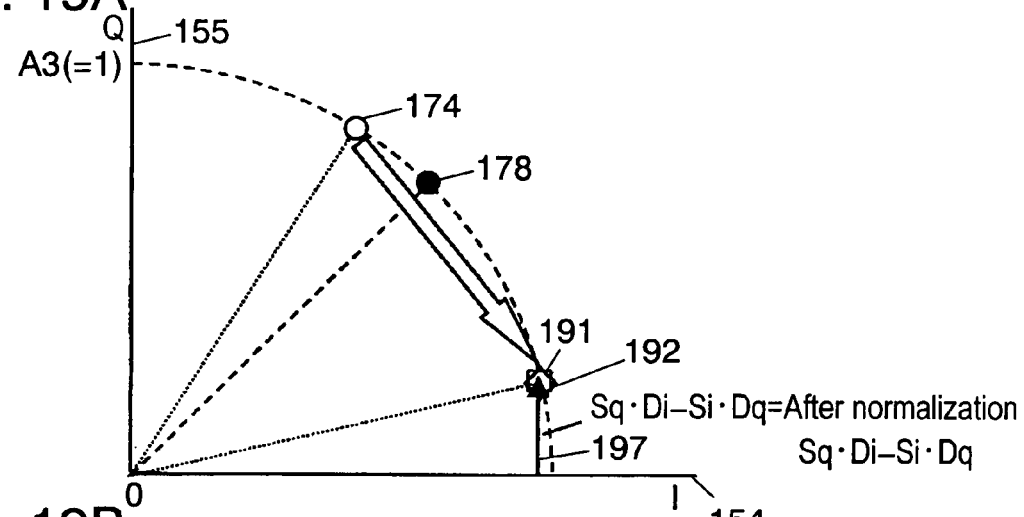
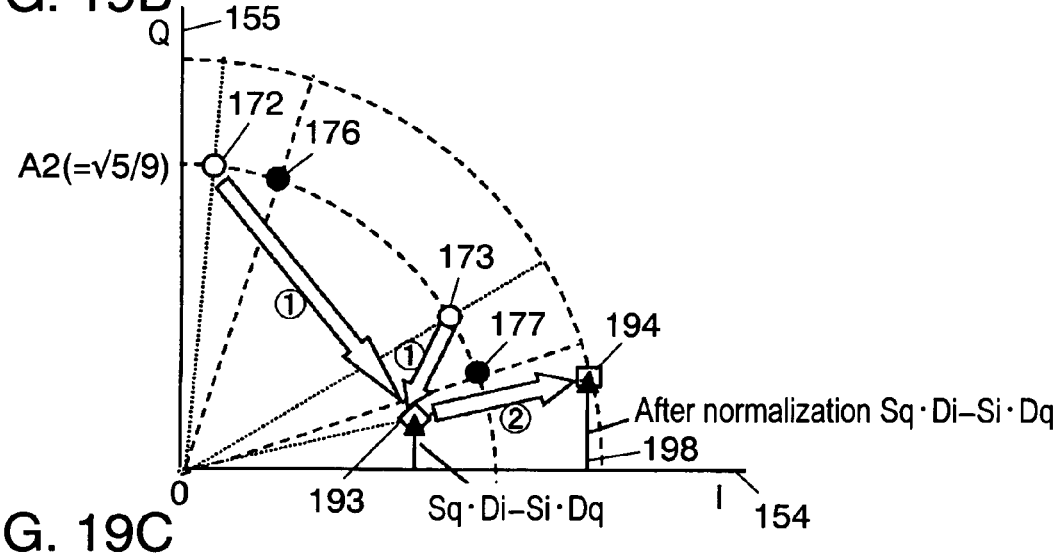
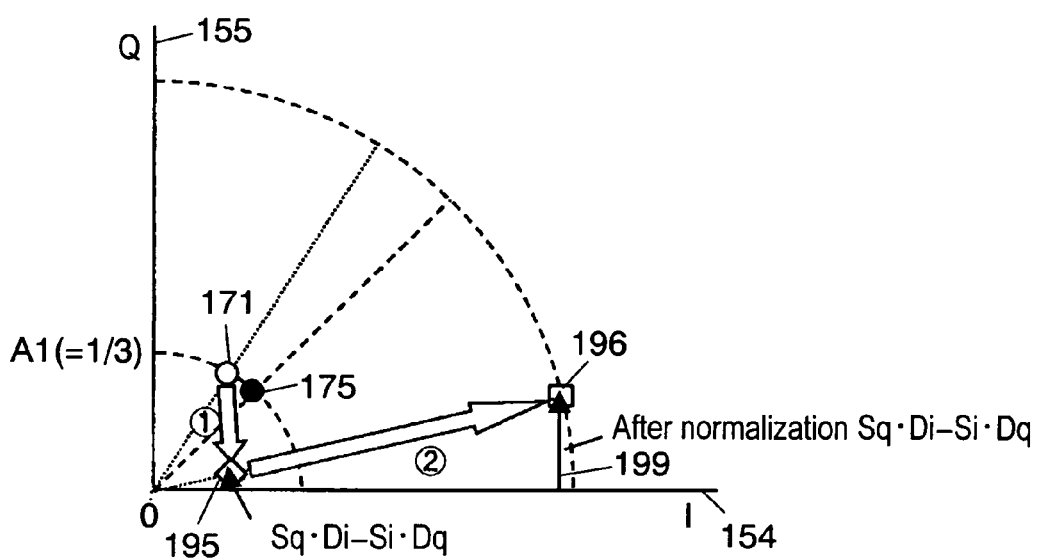

CARRIER RECOVERY APPARATUS

THIS APPLICATION IS A U.S. NATIONAL PHASE APPLICATION OF PCT INTERNATIONAL APPLICATION PCT/JP03/02807.

TECHNICAL FIELD

The present invention relates to a carrier recovery apparatus used in demodulation of digital-modulated signals such as quadrature amplitude modulation (QAM) signals or phase shift keying (PSK) signals.

BACKGROUND ART

Recently, video signals have being digitized, and digital broadcast has been started around the world in broadcasting media of satellite, CATV, and terrestrial waves. As the transmission system, a system suited to features of each transmission line is selected. For example, phase shift keying such as 4PSK or 8PSK is employed in satellite broadcast, or quadrature amplitude modulation such as 64QAM or 256QAM is employed in CATV.

Demodulation systems of such digital-modulated signals are proposed in various publications, and, for example, by referring to "A study on QPSK demodulation system" by Taga, Ishikawa, and Komatsu (ITEJ Technical Report, vol. 15, No. 46, CE' 91-42 (August 1991), a conventional carrier recovery apparatus is explained.

FIG. 30 is a block diagram showing a configuration of carrier recovery apparatus in a prior art. In FIG. 30, the carrier recovery apparatus in the prior art comprises a modulated signal input terminal 5010, a complex multiplier 5011, an arc tangent arithmetic unit 5030 for calculating an arc tangent, a loop filter 5013, a numerical control oscillator 5014, and a demodulated signal output terminal 5015.

In FIG. 30, a signal line indicated by thick line and "/2" indicates a signal line of signal expressed by complex.

The operation of the carrier recovery apparatus in the prior art is briefly described below.

In FIG. 30, a received digital-modulated signal is once demodulated in quadrature in a front stage, and put into the modulated signal input terminal 5010. At the time of quadrature detection in the front stage, however, the carrier for quadrature detection is not always in accurate frequency and accurate phase. Therefore, the signal entered in the modulated signal input terminal 5010 involves a residual discrepancy of frequency and phase. The signal once fed into the modulated signal input terminal 5010 is further put into one input terminal of the complex multiplier 5011. The numerical control oscillator 5014 outputs a complex oscillation signal composed of two mutually orthogonal oscillation signals, and it is put into other input terminal of the complex multiplier 5011.

The complex multiplier 5011 multiplies the output of the numerical control oscillator 5014 and the signal entered in the modulated signal input terminal 5010, and removes the frequency and phase discrepancy of the signal entered in the modulated signal input terminal 5010, and outputs a demodulated signal through the demodulated signal output terminal 5015.

On the other hand, demodulated signals Si and Sq as outputs from the complex multiplier 5011 are put into the arc tangent arithmetic unit (Tan$^{-1}$) 5030. The arc tangent arithmetic unit (Tan$^{-1}$) 5030 calculates the arc tangent on the basis of the values of Si and Sq, and detects the phase error between the carrier signal of the digital-modulated signal supplied in the modulated signal input terminal 5010 and the output signal of the numerical control oscillator 5014. The output of the arc tangent arithmetic unit 5030 is put into the loop filter 5013, and the high frequency component of the phase error is eliminated. Thus, the output of the loop filter 5013 is put into the numerical control oscillator 5014 as the control signal to the numerical control oscillator 5014. The output signal of the numerical control oscillator 5014 controlled by the output signal of the loop filter 5013 is supplied into the complex multiplier 5011.

In the explanation above, as shown in formula (1) and formula (2), the output signal of the numerical control oscillator 5014 is a signal in conjugate relation with the carrier signal of the signal entered in the modulated signal input terminal 5010 (that is, free from frequency discrepancy and phase discrepancy). Therefore, as far as the relation for formula (1) and formula (2) is satisfied, the arc tangent arithmetic unit (Tan$^{-1}$) 5030 detects zero phase error. When there is a phase difference between formula (1) and formula (2), the arc tangent arithmetic unit (Tan$^{-1}$) 5030 outputs a signal corresponding to the phase error.

Since the negative feedback control loop is composed by the phase control loop thus composed, the carrier synchronized in phase with the received digital-modulated signal is reproduced in the numerical control oscillator 5014. This reproduced carrier is in conjugate relation with the carrier signal of the signal entered in the modulated signal input terminal 5010 (that is, free from frequency discrepancy and phase discrepancy), and is free from frequency error and phase error, so that a correct demodulated signal may be obtained.

As mentioned above, the phase error detection in a conventional carrier recovery circuit is performed by arc tangent calculation of the output of the complex multiplier 5011 by the arc tangent arithmetic unit 5030. This operation is further described below by referring to FIG. 31.

FIG. 31 is an output signal space diagram for explaining the operation of conventional phase error detection. Herein, the digital-modulated signal to be received is assumed to be 4PSK, and for the ease of explanation, only the first quadrant is explained. Assume there is a phase error of $\Delta\theta$ between the digital-modulated signal entered in the modulated signal input terminal 5010 and the output signal of the numerical control oscillator 5014. The demodulated signal which is the output of the complex multiplier 5011 is indicated by mark "○" 5041. If an accurate carrier is reproduced, there is no phase error $\Delta\theta$, an hence the demodulated signal which is the output of the complex multiplier 5011 is indicated by mark "mark "●" 5042 which is the intrinsic phase of the symbol of 4PSK. The phase indicated by mark "mark "●" 5042 is ($\pi/4+n\cdot\pi/2$) [radian] (n=0, 1, 2, 3). However, since the presence of phase error $\Delta\theta$ is assumed, the output signal from the complex multiplier 5011 is present at the position of phase $\phi$ ($\phi=\pi/4+\Delta\theta$).

This phase error $\Delta\theta$ was calculated by obtaining the phase $\phi$ by calculating the arc tangent on the basis of outputs Si and Sq of the complex multiplier 5011, and obtaining the difference of the phase $\phi$ of this reception symbol and the symbol phase ($\pi/4$) of the intrinsic 4PSK.

Incidentally, the calculation of arc tangent for obtaining the phase $\phi$ of the reception symbol is generally performed by storing the value of Tan$^{-1}$ (Sq/Si) preliminarily calculated in Si and Sq generally in a storage device such as ROM, and reading out by using Si and Sq as the address. Or, by calculating the rotation of two-dimensional vector on the basis of Si and Sq, the angle of the portion of rotation is obtained, which is known as Cordic algorithm.

However, the calculating method of arc tangent by using the ROM requires an enormous ROM capacity, and the circuit scale increases. The Cordic method requires many steps to obtain the phase of high precision, and the frequency capture range becomes narrow due to increase in the delay in loop of the carrier recovery circuit.

DISCLOSURE OF THE INVENTION

A carrier recovery apparatus of the invention comprises:

a numerical control oscillating means for outputting a complex oscillation signal;

a complex multiplying means for multiplying a modulated signal being input and an output of the numerical control oscillating means;

a phase error detecting means for detecting a phase error between the modulated signal and the complex oscillation signal on the basis of the output of the complex multiplying means; and a loop filter for controlling the numerical control oscillating means by filtering the phase error, wherein a carrier of the modulated signal is recovered by the numerical control oscillating means; and wherein the phase error detecting means comprises at least a symbol estimating means for estimating a symbol on the basis of an output of the complex multiplying means.

BRIEF DESCRIPTION OF THE DRAWINGS

FIG. 16 is a diagram schematically explaining the operation of phase error detector 12a.

FIG. 19A, FIG. 19B, and FIG. 19C are diagrams schematically explaining the operation of phase error detector 12b.

DETAILED DESCRIPTION OF THE PREFERRED EMBODIMENTS

Figure 1:
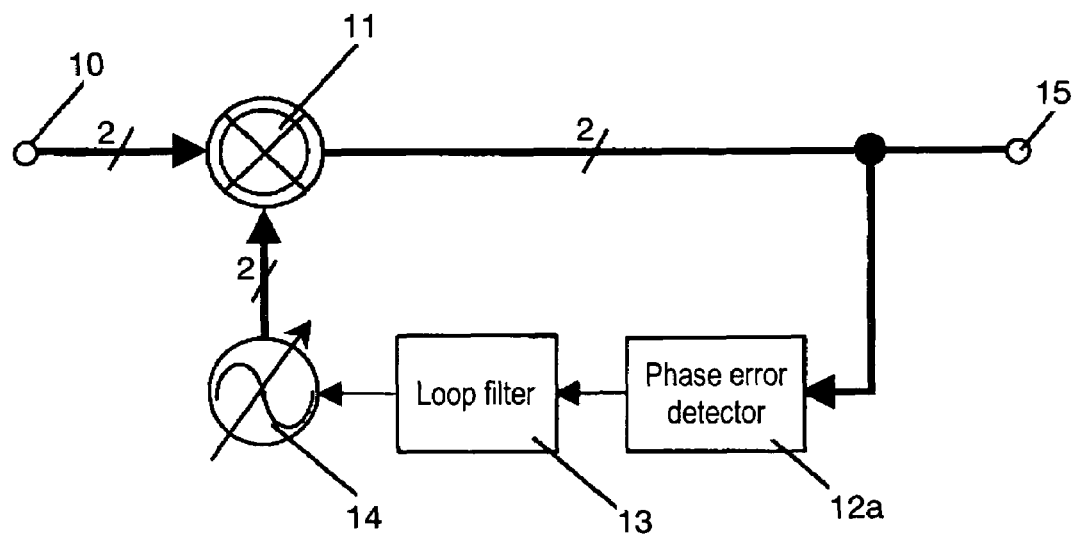
FIG. 1 is a block diagram showing a configuration of carrier recovery apparatus in preferred embodiment 1 of the invention.

Preferred embodiments of the invention are described below by referring to FIG. 1 to FIG. 29.

In the following explanation, preferred embodiment 1 is a basic carrier recovery apparatus of the invention.

Preferred embodiment 2 is a carrier recovery apparatus similar to preferred embodiment 1, except that the frequency capture range characteristic and the phase jitter characteristic are improved at reception of quadrature amplitude modulation (QAM) signal that has further states than that in preferred embodiment 1.

Preferred embodiment 3 is a carrier recovery apparatus similar to preferred embodiment 1 and preferred embodiment 2, except that the frequency capture range characteristic and the phase jitter characteristic are further improved in the reception status having noise or reflection interference.

Preferred embodiment 4 is a carrier recovery apparatus similar to preferred embodiment 1, preferred embodiment 2, and preferred embodiment 3, except that the frequency capture range characteristic and the phase jitter characteristic are further improved in the reception status having noise or reflection interference when receiving 16QAM, 64QAM, 256QAM, 1202QAM, and others (that is, in (2^2n)QAM, n=2, 3, 4, 5, . . . ).

Preferred embodiment 5 is a carrier recovery apparatus similar to preferred embodiment 1, preferred embodiment 2, preferred embodiment 3, and preferred embodiment 4, except that the frequency capture range is further improved.

Preferred Embodiment 1

FIG. 1 is a block diagram showing a configuration of carrier recovery apparatus in preferred embodiment 1 of the invention.

In FIG. 1, it comprises a modulated signal input terminal 10, a complex multiplier 11, a phase error detector 12a, a loop filter 13, a numerical control oscillator 14, and a demodulated signal output terminal 15.

In FIG. 1, a signal line indicated by thick line and "/2" indicates a signal line of signal expressed by complex (in the following drawings, the signal line indicated by thick line and "/2" means the same).

An outline of the carrier recovery apparatus in preferred embodiment 1 is explained below.

FIG. 1 shows an example of receiving signals of quadrature amplitude modulation or pulse shift keying. The received digital-modulated signal is once demodulated in quadrature in a front stage, and put into the modulated signal input terminal 10. At the time of quadrature detection in the front stage, however, the carrier for quadrature detection is not always in accurate frequency and accurate phase. Therefore, the signal entered in the modulated signal input terminal 10 involves a residual discrepancy of frequency and phase. That is, this signal is a signal expressed in formula (1) where Si is I (in-phase) signal component and Sq is Q (quadrature) signal component.

$$(Si+jSq)\cdot\exp(j(\Delta wt+\Delta\theta)) \quad (1)$$

where $\Delta w$: frequency discrepancy, $\Delta\theta$: phase discrepancy.

The signal expressed in formula (1) is put into the modulated signal input terminal 10, and is further put into one input terminal of the complex multiplier 11. The numerical control oscillator 14 outputs a signal expressed in formula (2) which is supposed to be a signal in conjugate relation with the carrier component (exp (j($\Delta wt+\Delta\theta$))) of the signal expressed in formula (1).

$$\exp(-j(\Delta wt+\Delta\theta)) \quad (2)$$

That is, the numerical control oscillator 14 outputs a complex oscillation signal composed of two mutually orthogonal oscillation signals, and it is put into other input terminal of the complex multiplier 11.

The complex multiplier 11 multiplies the output of the numerical control oscillator 14 and the input signal fed to the modulated signal input terminal 10, and executes the calculation shown in formula (3).

$$(Si+jSq)\cdot\exp(j(\Delta wt+\Delta\theta))\cdot\exp(-j(\Delta wt+\Delta\theta))=(Si+jSq) \quad (3)$$

The complex multiplier 11 eliminates the discrepancy of frequency and phase of the signals entered in the input terminal 10, and outputs a demodulated signal (Si+jSq) by way of the demodulated signal output terminal 15.

On the other hand, the demodulated signal which is the output of the complex multiplier 11 is also put into the phase error detector 12a. The phase error detector 12a detects the phase error of the received digital-modulated signal on the basis of Si and Sq. The output of the phase error detector 12a is put into the loop filter 13, and the high frequency component of the phase error is removed. Thus, it is fed into the numerical control oscillator 14 as a control signal. The output signal of the numerical control oscillator 14 controlled by the output signal of the loop filter 13 is supplied into the complex multiplier 11.

In the explanation above, as shown in formula (1) and formula (2), the output of the numerical control oscillator 14 is shown in conjugate relation with the carrier signal of the input signal fed to the modulated signal input terminal 10 (that is, free from frequency discrepancy and phase discrepancy). Therefore, when conforming to the relation of formula (1) and formula (2), the phase error detector 12a detects zero phase error. If there is a phase error between formula (1) and formula (2), the phase error detector 12a detects its phase error.

Since the negative feedback control loop is composed by the phase control loop thus composed, the carrier synchronized in phase with the received digital-modulated signal is recovered in the numerical control oscillator 14. This recovered carrier is in conjugate relation with the carrier signal of the signal entered in the modulated signal input terminal 10, and is free from frequency error and phase error, so that a correct demodulated signal can be obtained.

Figure 5:
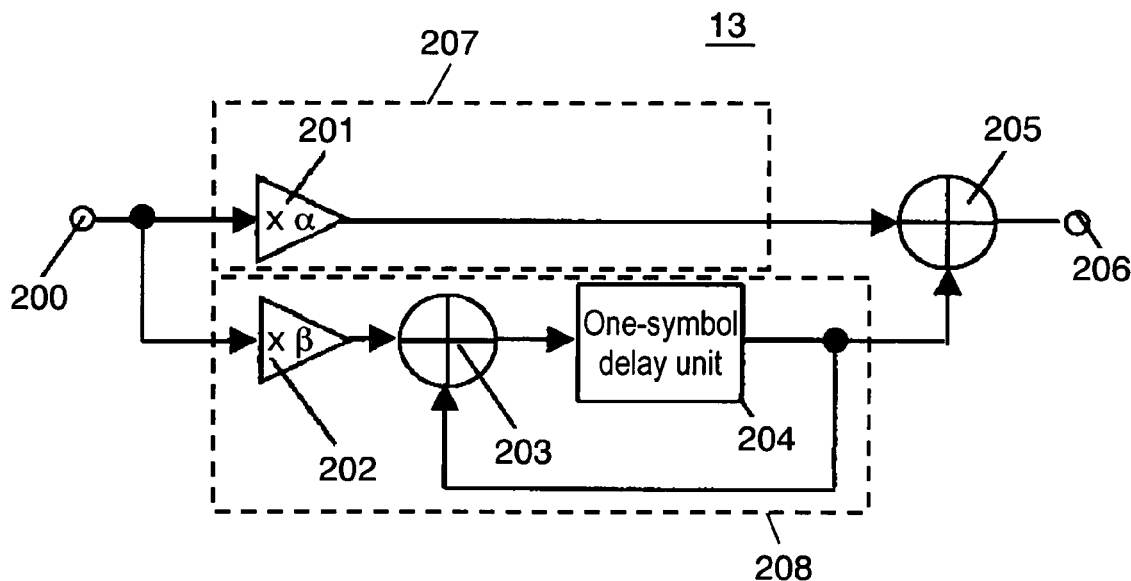
FIG. 5 is a block diagram showing a specific configuration of loop filter 13 in the carrier recovery apparatus in preferred embodiment 1 of the invention.

FIG. 5 is a block diagram showing a specific configuration of the loop filter 13 in FIG. 1. The loop filter 13 comprises a phase error signal input terminal 200, a direct system amplifier 201, an integral system amplifier 202, a first adder 203, a one-symbol delay unit 204, a second adder 205, and a control signal output terminal 206.

The output of the phase error detector 12a is supplied into the phase error signal input terminal 200. The loop filter 13 is composed of the phase error signal input terminal 200, a direct system 207, an integral system 208, second adder 205, and loop filter output terminal 206. The direct system 207 is composed of the direct system amplifier 201. The integral system 208 is composed of the integral system amplifier 202, first adder 203, one-symbol delay unit 204.

The direct system 207 is composed of only the direct system amplifier 201 of which amplification factor is $\alpha$, and processes the phase error signal entered through the phase error signal input terminal 200 only by amplifying by amplification factor of α. The numerical control oscillator 14 is an oscillator of a type of advancing (or delaying) the output phase in proportion to the input control signal. Therefore, this direct system 207 functions to advance (or delay) the output phase of the numerical control oscillator 14 linearly with respect to the phase error signal. That is, this direct system is a system acting to correct the phase error in carrier recovery.

On the other hand, in the integral system 208, first, the integral system amplifier 202 amplifies the phase error signal entered through the phase error signal input terminal 200 by amplification factor of β. The first adder 203 adds the output of the integral system amplifier 202 and the output of the one-symbol delay unit 204. The output of the first adder 203 is put into the one-symbol delay unit 204. Therefore, the loop composed of the first adder 203 and one-symbol delay unit 204 has a so-called integral function. In this way, the integral system 208 amplifies the phase error signal entered through the phase error input terminal 200 by the amplification factor of β, and executes the so-called integral processing. The numerical control oscillator 14 is an oscillator of a type of advancing (or delaying) the output phase in proportion to the input control signal. Therefore, this integral system 208 functions to control the output frequency of the numerical control oscillator 14 on the basis of the phase error signal. That is, this integral system 208 is a system acting to correct the frequency error in carrier recovery.

The output signal of the numerical control oscillator 14 controlled by the out signal of the loop filter 13 is supplied into the multiplex multiplier 11.

Since the negative feedback control loop is composed by the phase control loop thus composed, the carrier synchronized in phase with the received digital-modulated signal is recovered in the numerical control oscillator 14. This recovered carrier is in conjugate relation with the carrier signal of the signal entered in the modulated signal input terminal 10, and is free from frequency error and phase error, so that a correct demodulated signal can be obtained.

Figure 2:
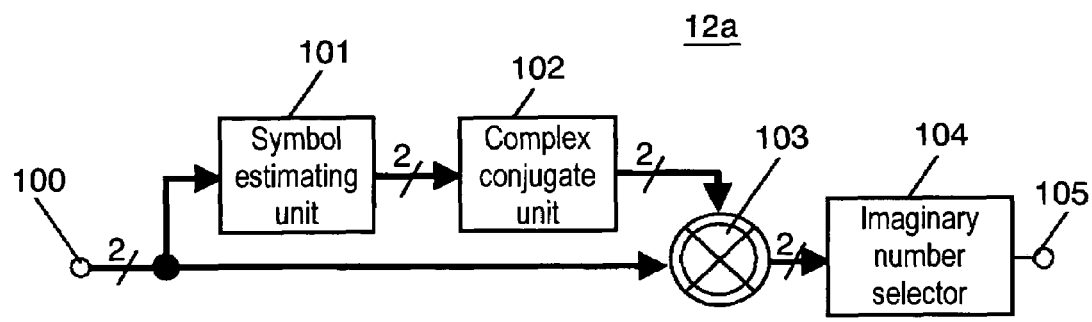
FIG. 2 is a block diagram showing an example of specific configuration of phase error detector 12a in the carrier recovery apparatus in preferred embodiment 1 of the invention.

Referring to FIG. 2, the operation of the phase error detector 12a of the carrier recovery apparatus in preferred embodiment 1 of the invention is explained.

FIG. 2 is a block diagram showing a specific configuration of the phase error detector 12a in the carrier recovery apparatus in FIG. 1. In FIG. 2, the phase error detector 12a comprises a demodulated signal input terminal 100, a symbol estimating unit 101, a complex conjugate unit 102, a second complex multiplier 103, an imaginary number selector 104, and a phase error output terminal 105.

In FIG. 1, if the output of the numerical control oscillator 14 is in conjugate relation with the carrier of the signal applied in the modulated signal input terminal 10 (that is, free from frequency discrepancy and phase discrepancy), the output of the complex multiplier 11 outputs a correct demodulated signal. If the phase of the output signal of the numerical control oscillator 14 is no longer in conjugate relation with the phase of the carrier of the signal applied in the demodulated signal input terminal 10 (that is, there are frequency discrepancy and phase discrepancy), the complex multiplier 11 cannot output a correct demodulated signal.

The output of the complex multiplier 11 is supplied into the symbol estimating unit 101 and second complex multiplier 103 by way of the demodulated signal input terminal 100. The symbol estimating unit 101 estimates the transmitted symbol on the basis of the demodulated signal entered from the demodulated signal input terminal 100, and outputs the result of estimation.

Figure 15A:
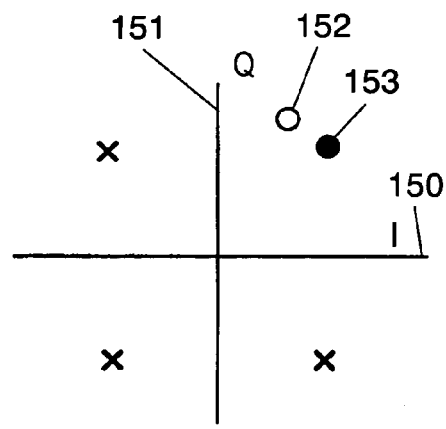
FIG. 15A and FIG. 15B are diagrams schematically explaining the operation of symbol estimating unit 101.
Figure 15B:
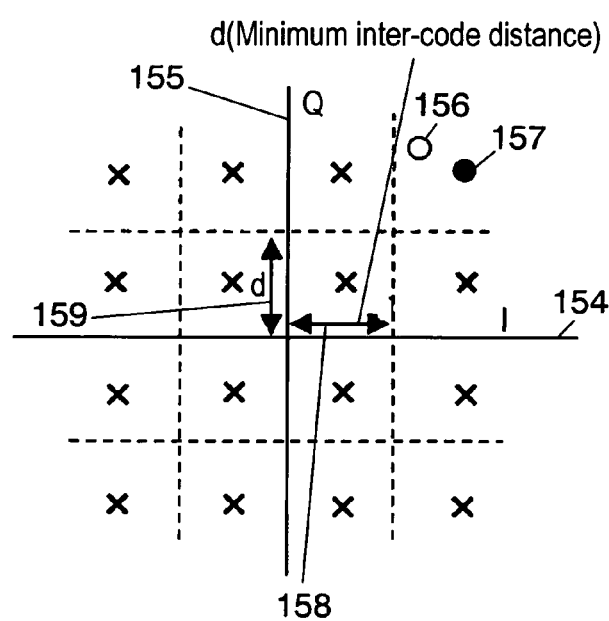

The symbol estimating unit 101 is specifically described by referring to FIG. 15A and FIG. 15B. FIG. 15A and FIG. 15B are diagrams showing the operation of the symbol estimating unit 101, indicating a case of 4PSK in FIG. 15A and a case of 16QAM in FIG. 15B.

In FIG. 15A, an axis 150 is an I signal axis, and an axis 152 is a Q signal axis. Assuming the output signal phase of the numerical control oscillator 14 in FIG. 1 to be not in conjugate relation with the phase of the carrier of the signal entered through the modulated signal input terminal 10 (that is, there are frequency discrepancy and phase discrepancy), if a symbol indicated by mark "●" 153 is transmitted, the signal output from the complex multiplier 11 is a symbol indicated by mark "○" 152.

On the other hand, in FIG. 15B, an axis 154 is an I signal axis, and an axis 155 is a Q signal axis. Assuming the output signal phase of the numerical control oscillator 14 in FIG. 1 to be not in conjugate relation with the phase of the carrier of the signal entered through the modulated signal input terminal 10 (that is, there are frequency discrepancy and phase discrepancy), if a symbol indicated by mark "●" 157 is transmitted, the signal output from the complex multiplier 11 is a symbol indicated by mark "○" 156.

Arrow 158 indicates the minimum inter-code distance d in the I signal axis direction (axis 154 direction), and arrow 159 indicates the minimum inter-code distance d in the Q signal axis direction (axis 155 direction).

The symbol estimating unit 101, if the input signal is the symbol of mark "○" 152 in FIG. 15A, estimates that the closest symbol of mark "●" 153 is transmitted, and outputs the symbol of mark "●" 153. The symbol estimating unit 101, if the input signal is the symbol of mark "○" 156 in FIG. 15B, estimates that the closest symbol of mark "●" 157 is transmitted, and outputs the symbol of mark "●" 157.

In this way, of the estimated output values, the value of I signal axis is supposed to be Di, and the value of Q signal axis is Dq. By complex expression, this output is expressed as (Di+jDq).

The output of the symbol estimating unit 101 is put into the complex conjugate unit 102 in FIG. 2, and the complex conjugate unit 102 calculates the complex conjugate of the output of the symbol estimating unit 101 expressed as (Di+jDq). That is, the complex conjugate unit 102 inverts the sign of Dq which is Q axis component out of the output of the symbol estimating unit 101, and generates (Di+jDq). The output of the complex conjugate unit 102 is put into the second complex multiplier 103. The second complex multiplier 103 multiplies the output (Di+jDq) of the complex conjugate unit 102 and the demodulated signal (Si+jSq) entered from the demodulated signal input terminal 100. Therefore, the second complex multiplier 103 outputs the calculation result expressed in formula (4).

$$(Si \cdot Di + Sq \cdot Dq) + j(Sq \cdot Di - Si \cdot Dq) \qquad (4)$$

The output of the second complex multiplier 103 is put into the imaginary number selector 104, and the imaginary number selector 104 selects only the imaginary part (Sq·Di−Si·Dq) of formula (4), and outputs as a phase error signal.

Figure 16:
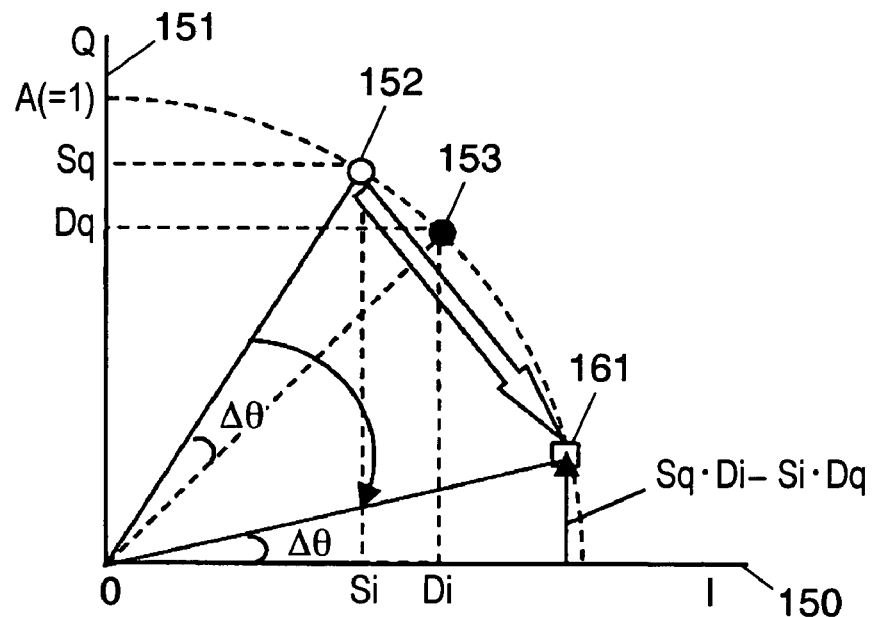

The principle of obtaining the phase error by the phase error detector 12a is further explained by referring to FIG. 16. FIG. 16 expresses the operation of the phase error detector 12a by signal space diagram. Assuming the digital-modulated signal to be received to be 4PSK, only the first quadrant is explained for the sake of simplicity.

In FIG. 16, axis 150 is an I signal axis and axis 151 is a Q signal axis. They correspond to axis 150 and axis 151 respectively in FIG. 15A. mark "●" 153 and mark "○" 152 correspond to mark "●" 153 and mark "○" 152 respectively in FIG. 15A. Mark "○" 152 is an output signal of the complex multiplier 11 in FIG. 1. The carrier of the quadrature modulation signal entered from the modulated signal input terminal 10 and the output signal of the numerical control oscillator 14 are assumed to have a phase error $\Delta\theta$. Therefore, mark "○" 152 has a phase error $\Delta\theta$ to mark "●" 153 of the original symbol. That is, the output of the complex multiplier 11 in FIG. 1 can be expressed as in formula (5).

$$A \cdot \exp(j(\phi+\Delta\theta)) = Si + jSq \qquad (5)$$

where
 A: amplitude (assumed not accompanied by deterioration in amplitude direction)
 $\phi$: intrinsic phase of symbol
 $\Delta\theta$: phase error As mentioned above, the symbol estimating unit 101 in FIG. 2 estimates the symbol (mark "●" 153 in FIG. 15A) of the first quadrant closet to the demodulated signal (mark "○" 152 in FIG. 15A) of the output of the complex multiplier 11, out of four original 4PSK symbols, as the transmitted symbol, and outputs it. The output of the symbol estimating unit 101 can be expressed as in formula (6).

$$A \cdot \exp(j(\phi)) = Di + jDq \qquad (6)$$

The output of the symbol estimating unit 101 is put into the complex conjugate unit 102, and the complex conjugate is performed as in formula (7), and is put into the second complex multiplier 103.

$$A \cdot \exp(j(-\phi)) = Di + jDq \qquad (7)$$

The second complex multiplier 103 operates as in formula (8), in which the demodulated signal as the output of the complex multiplier 11 and the output of the complex conjugate unit 102 are multiplied.

$$A^2 \cdot \exp(j(\Delta\theta)) = (Si \cdot Di + Sq \cdot Dq) + j(Sq \cdot Di - Si \cdot Dq) \qquad (8)$$

As known from formula (8), the output of the second complex multiplier 103 is a signal of which phase term has the error phase $\Delta\theta$ only. The output of the second complex multiplier 103 is indicated by mark "□" 161 in FIG. 16. (In FIG. 16, A=1.) That is, the output of the complex multiplier 11 entered in the phase error detector 12a is calculated in the process up to the second complex multiplier 103, and is shifted from the vector in the center of mark "●" 153 as the original modulation symbol to the vector in the center of the positive portion of the I signal axis 150.

The imaginary number selector 104 selects only the imaginary part of the output of the second complex multiplier 103 as the value corresponding to the phase error $\Delta\theta$, that is, (Sq·Di−Si·Dq). As a result, the phase error detection is performed.

Figure 3:
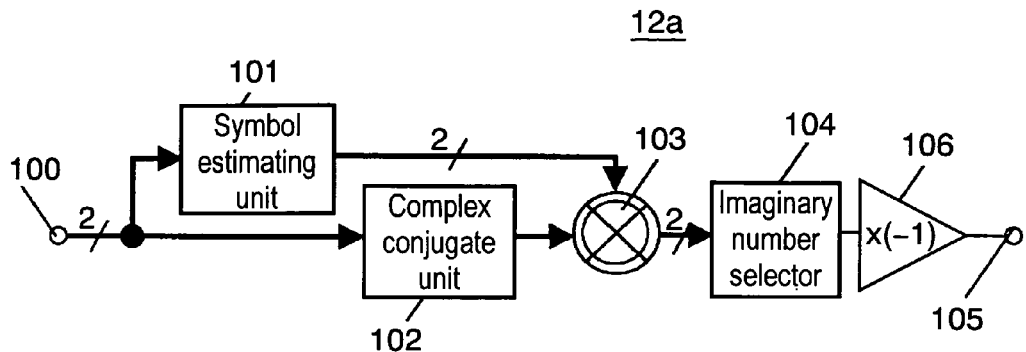
FIG. 3 is a block diagram showing an example of specific configuration of phase error detector 12a in the carrier recovery apparatus in preferred embodiment 1 of the invention.

FIG. 3 shows other configuration of the phase error detector 12a in FIG. 1. In FIG. 3, the demodulated signal input terminal 100, symbol estimating unit 101, complex conjugate unit 102, second complex multiplier 103, imaginary number selector 104, and phase error detection output terminal 105 are same as in FIG. 2. Therefore the detailed description of these components is omitted.

The complex conjugate unit 102 determines the complex conjugate of the demodulated signal entered through the demodulated signal input terminal 100. The second complex multiplier 103 multiplies the output of the symbol estimating unit 101 and the output of the complex conjugate unit 102. The imaginary number selector 104 selects and outputs only the imaginary part of the output of the second complex multiplier 103. A sign inverter 106 inverts the sign of the output of the imaginary number selector 104, and outputs as phase error signal by way of the phase error output terminal 105. The phase error detection output thus created is (Sq·Di−Si·Dq) same as in FIG. 2.

The phase error detectors 12a shown in FIG. 2 and FIG. 3 are both designed to output the imaginary part (Sq·Di−Si·Dq) of the result of complex multiplication of the demodulated signal entered from the demodulated signal input terminal 100 and its symbol estimation result.

Figure 4:
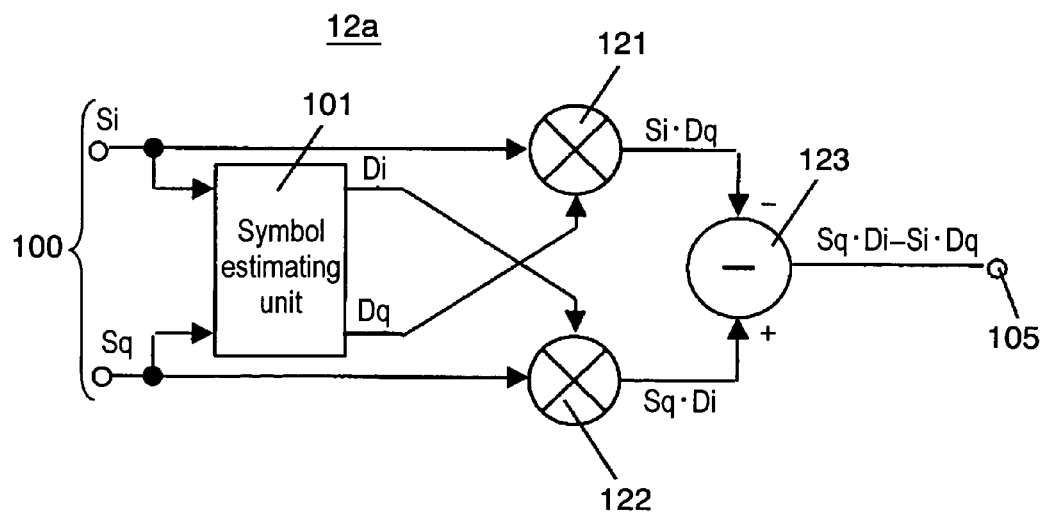
FIG. 4 is a block diagram showing an example of specific configuration of phase error detector 12a in the carrier recovery apparatus in preferred embodiment 1 of the invention.

FIG. 4 shows other configuration for executing a processing equivalent to such processing. In FIG. 4, the demodulated signal input terminal 100, symbol estimating unit 101, and phase error detection output terminal 105 are same as in FIG. 2 and FIG. 3. Therefore the detailed description of these components is omitted.

The symbol estimating unit 101 estimates the symbol of the demodulated signal entered by way of the demodulated signal input terminal 100. A multiplier 122 multiplies I signal component (Di) of output of the symbol estimating unit 101 and Q signal component (Sq) of demodulated signal entered by way of the demodulated signal input terminal 100, and outputs the product (Di·Sq). A multiplier 121 multiplies Q signal component (Dq) of output of the symbol estimating unit 101 and I signal component (Si) of demodulated signal entered by way of the demodulated signal input terminal 100, and outputs the product (Dq·Si). A subtractor 123 subtracts the output of the multiplier 121 and the output of the multiplier 122, and outputs a phase error by way of the phase error detection output terminal 105. Therefore, the phase error output from the phase error detection output terminal 105 is (Sq·Di−Si·Dq), so that the phase error can be performed same as in FIG. 2 and FIG. 3.

Thus, according to the carrier recovery apparatus in preferred embodiment 1 of the invention, the phase error of quadrature modulation signal can be detected by simple calculation, and circuit scale becomes to be a small enough, and it is possible to prevent narrowing of the frequency capture range due to increase of the delay in the loop.

The foregoing explanation relates to embodiments of 4PSK, but same effects are obtained by other phase shift keying (nPSK) or quadrature amplitude modulation (nQAM).

Preferred Embodiment 2

A carrier recovery apparatus in preferred embodiment 2 of the invention is similar to the carrier recovery apparatus in preferred embodiment 1, except that the frequency capture range and the phase jitter characteristic are further improved at the time of reception of quadrature amplitude modulation (nQAM) signals that has further states.

The carrier recovery apparatus in preferred embodiment 2 of the invention is explained below.

Figure 6:
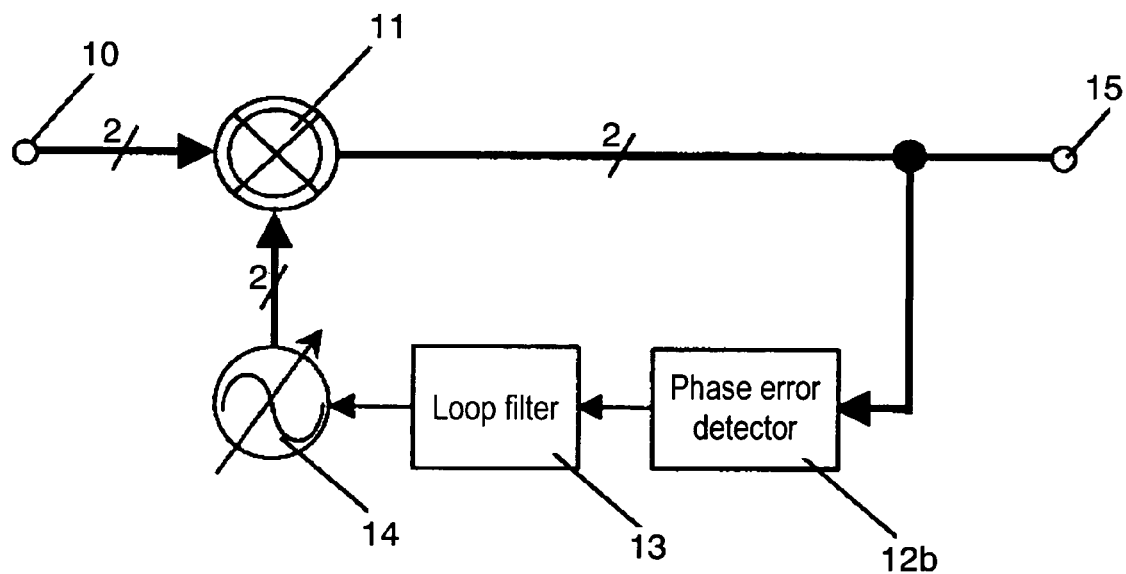
FIG. 6 is a block diagram showing a configuration of carrier recovery apparatus in preferred embodiment 2 of the invention.

FIG. 6 is a block diagram showing a configuration of the carrier recovery apparatus in preferred embodiment 2 of the invention. In FIG. 6, it comprises a modulated signal input terminal 10, a complex multiplier 11, a phase error detector 12b, a loop filter 13, a numerical control oscillator 14, and a demodulated signal output terminal 15.

As shown in FIG. 6, the carrier recovery apparatus in preferred embodiment 2 is similar to the carrier recovery apparatus in preferred embodiment 1, except that the phase error detector 12a is replaced by the phase error detector 12b.

The other part of structure of the carrier recovery apparatus in preferred embodiment 2 is similar to that of the carrier recovery apparatus in preferred embodiment 1, and same parts are identified with same reference numerals and their explanation is omitted.

The operation of the phase error detector 12b different from the carrier recovery apparatus in preferred embodiment 1 is explained below by referring to FIG. 7.

Figure 7:
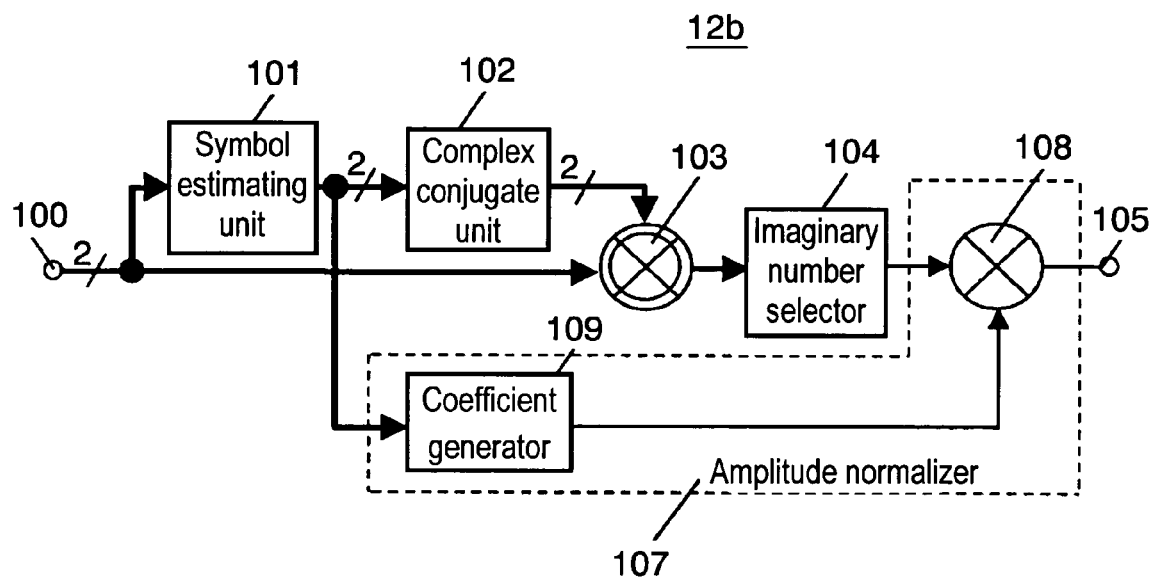
FIG. 7 is a block diagram showing an example of specific configuration of phase error detector 12b in the carrier recovery apparatus in preferred embodiment 2 of the invention.

In FIG. 7, the phase error detector 12b comprises a demodulated signal input terminal 100, a symbol estimating unit 101, a complex conjugate unit 102, a second complex multiplier 103, an imaginary number selector 104, a phase error output terminal 105, and an amplitude normalizer 107.

This phase error detector 12b is similar to the phase error detector 12a in preferred embodiment 1, except that the amplitude normalizer 107 is further added. The other configuration is same as the phase error detector 12a, and same components are identified with same reference numerals and the explanation is omitted.

The second complex multiplier 103, as explained in the carrier recovery apparatus in preferred embodiment 1, multiplies in complex the demodulated signal (Si+jSq) entered through the demodulated signal input terminal 100 and the output (Di−jDq) of the complex conjugate unit 102. Its output signal is expressed in formula (8). As shown in this formula (8), the output of the second complex multiplier 103 is the function of the phase error ($\Delta\theta$) and the square of the amplitude value ($A^2$). Accordingly, when receiving the QAM differing in the amplitude depending on the symbol, the gain of the phase error being detected differs depending on the symbol. This situation is shown by referring to FIG. 17.

Figure 17:
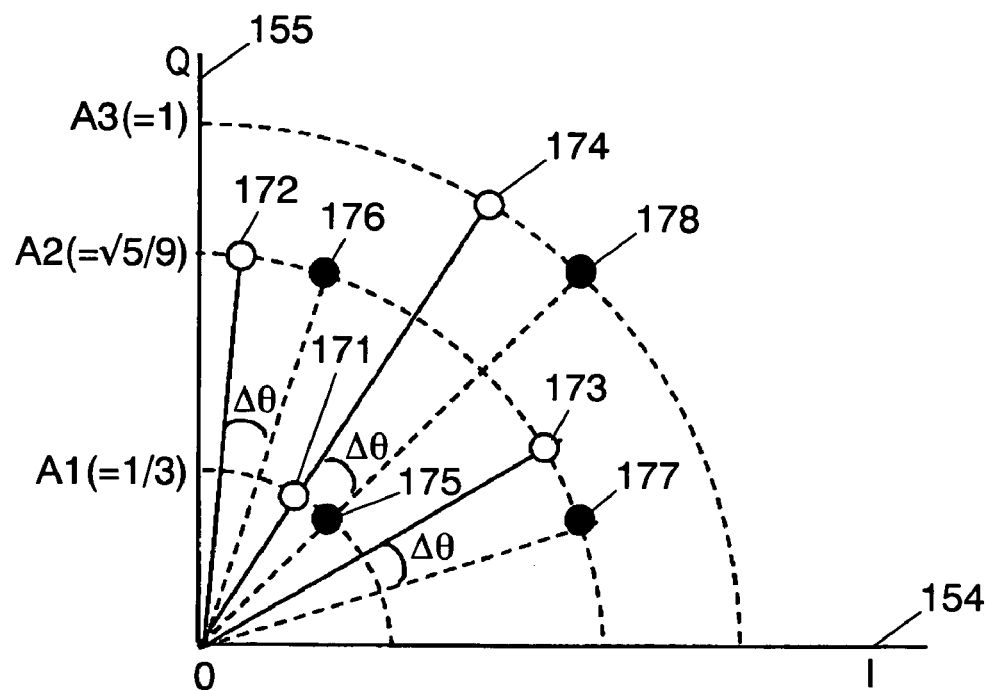
FIG. 17 is a diagram expressing an input QAM signal with phase discrepancy by signal space diagram.

In FIG. 17, axis 154 is an I signal axis, and axis 155 is a Q signal axis. Mark "○" 171 through mark "○" 174 are an input symbols, and mark "●" 175 through from mark "●" 178 are original symbols which are transmitted. When receiving the QAM differing in the amplitude depending on the symbol, since the phase error which is the result of detection is also the function of square of amplitude value ($A^2$), the gain of the detected phase error differs depending on the modulation symbol being transmitted. Accordingly, the frequency capture may become to be harder. Or, if the frequency is captured and the phase is synchronized, a large phase jitter may occur in the demodulated output. Therefore, the carrier recovery apparatus of preferred embodiment 2 further comprises the amplitude normalizer 107. The amplitude normalizer 107 compensates gain variations of the phase error signal generated due to difference in the symbol of the phase error to be detected. The operation of the amplitude normalizer 107 is explained.

In FIG. 7, the amplitude normalizer 107 is composed of a coefficient generator 109 and a multiplier 108. The coefficient generator 109 receives the output of the symbol estimating unit 101, and generates a coefficient depending on the amplitude of each modulation symbol.

Figures 18A, 18B, 18C:
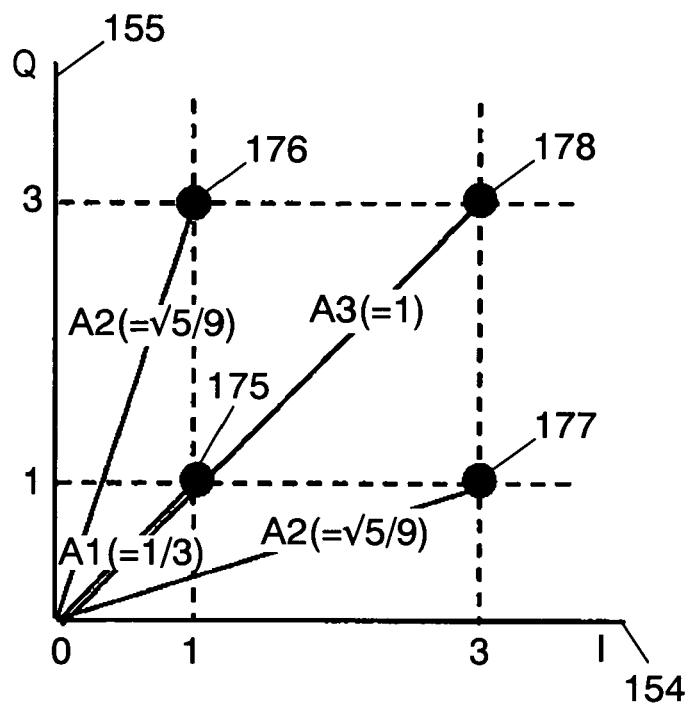
FIG. 18A, FIG. 18B, and FIG. 18C are diagrams showing a coefficient generating method in coefficient generator 109.

FIG. 18A, FIG. 18B, and FIG. 18C show examples of coefficient generating method. Herein, for the sake of simplicity of explanation, the digital-modulated signal to be received is assumed to be 16QAM, and only the first quadrant is explained (not limited to 16QAM).

In FIG. 18A, I signal axis 154, Q signal axis 155, and symbols 175 to 178 are same as I signal axis 154, Q signal axis 155, and symbols 175 to 178 in FIG. 17. The result of estimation by the symbol estimating unit 101 is any one of symbols 175 to 178. Amplitude values of symbols 175 to 178 exist in three types.

Coordinates of each symbol are expressed as (I signal component, Q signal component). The outermost symbol, symbol 178 is (Di, Dq)=(3, 3), and the amplitude A3 in this case is normalized to 1.

Symbol 176 is (Di, Dq)=(1, 3), symbol 177 is (D1, Dq)=(3, 1), and the normalized amplitude A2 is $\sqrt{5/9}$.

Symbol 175 is (Di, Dq)=(1, 1), and the normalized amplitude A1 is ⅓.

As known from formula (8), the output of the second complex multiplier 103 is proportional to the square of the amplitude ($A^2$) of the symbol. Accordingly, the coefficient generator 109 generates a coefficient corresponding to the reciprocal number ($1/A^2$) of the square of the amplitude value $A^2$ in each symbol as shown below.

That is, in the case of (Di, Dq)=(3, 3), as the coefficient, $1/A^2=1/(A3)^2=1$ is generated.

In the case of (Di, Dq)=(1, 3) and (3, 1), as the coefficient, $1/A^2=1/(A2)^2=9/5$ is generated.

In the case of (Di, Dq)=(1, 1), as the coefficient, $1/A^2=1/(A3)^2=9$ is generated.

Thus, the coefficient for normalizing the amplitude of the phase error is determined automatically when the symbol is estimated in the symbol estimating unit 101. Therefore, the coefficient generator 109, as shown in FIG. 18B, can be realized by a storage device such as ROM for storing the value of reciprocal number ($1/A^2$) of the square of amplitude ($A^2$) of each symbol, using the symbol estimating result (Di, Dq) of the symbol estimating unit 101 as the address.

The output of the coefficient generator 109 in FIG. 7 is put into the multiplier 108. The output of the imaginary number selector 104 is multiplied with the output of the coefficient generator 109 in the multiplier 108, so that the difference by the amplitude of each modulation symbol of the phase error to be detected is compensated.

FIG. 19A, FIG. 19B, and FIG. 19C are diagrams schematically explaining the operation of phase error detector 12b in carrier recovery in preferred embodiment 2 having the amplifier normalizer 107. FIG. 19A shows the operation of phase error detection in the case of (Di, Dq)=(3, 3), FIG. 19B shows it in the case of (Di, Dq)=(1, 3), (3, 1), and FIG. 19C shows it in the case of (Di, Dq)=(1, 1). In these diagrams, I signal axis 154, Q signal axis 155, symbols 171 to 178 are same as I signal axis 154, Q signal axis 155, symbols 171 to 178 in FIG. 17A or FIG. 18A.

In case that the quadrature modulation signal entered through the modulated signal input terminal 10 in FIG. 6 and the output signal of the numerical control oscillator 14 have a phase error $\Delta\theta$, the demodulated signal (Si+jSq) as the output of the complex multiplier 11 is any one of the symbol indicated by mark "○" 174 in FIG. 19A, the symbol indicated by mark "○" 172 or 173 in FIG. 19B, and the symbol indicated by mark "○" 171 in FIG. 19C. The result of symbol estimation of these symbols 171 to 174 is any one of the symbol indicated by mark "●" 178 in FIG. 19A, the symbol indicated by mark "●" 176 or 177 in FIG. 19B, and the symbol indicated by mark "●" 175 in FIG. 19C. As the conjugate signal (Di−jDq) and demodulated signal (Si+jSq) are multiplied by the second complex multiplier 103, {(Si·Di+Sq·Dq)+j(Sq·Di−Si·Dq)} is produced. The value expressed by {(Si·Di+Sq·Dq)+j(Sq·Di−Si·Dq)} conforms to mark "◊" 191 in FIG. 19A, mark "◊" 193 in FIG. 19B, and mark "◊" 195 in FIG. 19C. Thus, the output signal of the second complex multiplier 103 varies in the gain of its amplitude depending on the amplitude value of each symbol. Accordingly, the amplitude normalizer 107 normalizes the output of the second complex multiplier 103 by the reciprocal number ($1/A^2$) of the square of amplitude ($A^2$) in each symbol. That is, the amplitude normalizer 107 generates outputs by converting the mark "◇" 191 in FIG. 19A, mark "◇" 193 in FIG. 19B, and mark "◇" 195 in FIG. 19C into mark "□" 192 in FIG. 19A, mark "□" 194 in FIG. 19B, and mark "□" 196 in FIG. 19C. In this way, the output gain of the amplitude normalizer 107 is constant regardless of the reception symbols. The phase error detector 12b in the carrier recovery in preferred embodiment 2 outputs the imaginary part of the normalized output of the second complex multiplier 103 (Q signal axis component 197 in FIG. 19A, Q signal axis component 198 in FIG. 19B, and Q signal axis component 199 in FIG. 19C) as phase error.

Thus, the result of determining the reciprocal number of the square of the amplitude in each symbol is used as the coefficient, and by normalizing the output of the second complex multiplier 103 on the basis of this coefficient, the phase error to be detected is prevented from varying depending on the amplitude of each modulation symbol.

Thus, according to the carrier recovery apparatus of preferred embodiment 2 of the invention, since the phase error of quadrature modulation signal can be detected by a simple calculation, the required circuit scale is small, and the frequency capture range due to increase of delay in loop is prevented from being narrow. Moreover, when receiving the quadrature amplitude modulation (QAM) signals, the frequency capture characteristic and phase jitter characteristic can be improved.

Incidentally, FIG. 18C, different from FIG. 18B, shows a case in which the ROM stores the square of the amplitude of each symbol as the coefficient. The phase error detector 12b shown in FIG. 7 has the amplitude normalizer 107 composed of the coefficient generator 109 for generating the reciprocal number of the square of amplitude of each symbol as the coefficient, and the multiplier 108. However, the same function can be realized by replacing the multiplier 108 by the divider and replacing the coefficient generator 109 by the structure as shown in FIG. 18C.

Generation of square of amplitude ($A^2$) in each symbol is not limited to the above composition, but same effects are obtained by replacing by the operation of $(Di)^2+(Dq)^2$ on the basis of the output of the symbol estimating unit 101 (D1, Dq).

In the phase error detector 12b in the configuration shown in FIG. 7, the configuration of the portion other than the amplitude normalizer 107 is explained on the basis of the phase error detector 12a in FIG. 2 in preferred embodiment 1, but same effects are obviously obtained by the phase error detector 12a in the configuration as shown in FIG. 3 or FIG. 4.

The foregoing explanation relates to embodiments of 16QAM, but same effects are obviously obtained by other quadrature amplitude modulation (32QAM, 64QAM, 128QAM, 256QAM, 512QAM, 1024QAM, etc.).

Preferred Embodiment 3

A carrier recovery apparatus in preferred embodiment 3 of the invention is similar to the carrier recovery apparatus in preferred embodiment 1 or preferred embodiment 2, except that the frequency capture range and the phase jitter characteristic can be further improved at the time of reception disturbed by noise or reflection.

The carrier recovery apparatus in preferred embodiment 3 of the invention is explained below.

Figure 8:
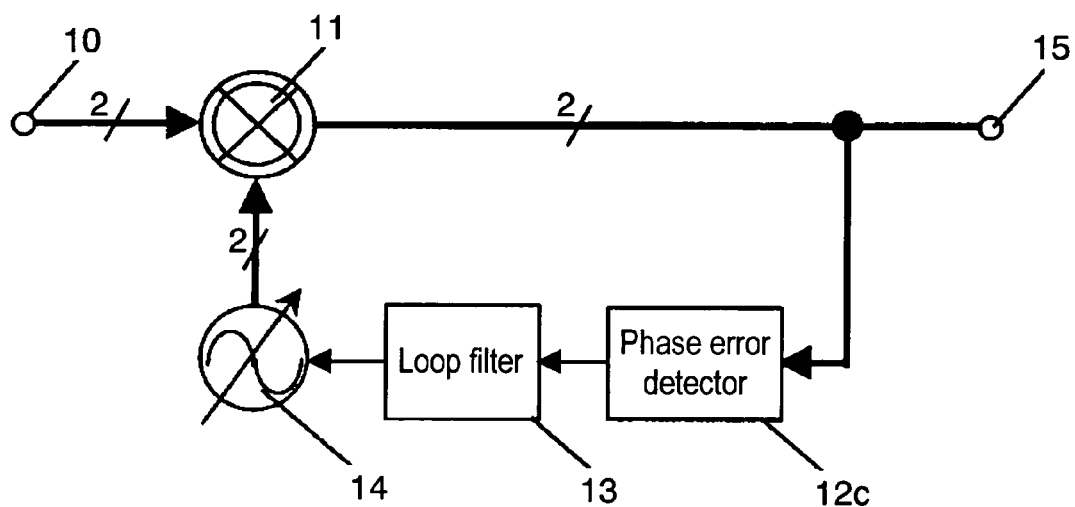
FIG. 8 is a block diagram showing a configuration of carrier recovery apparatus in preferred embodiment 3 of the invention.

FIG. 8 is a block diagram showing a configuration of the carrier recovery apparatus in preferred embodiment 3 of the invention. In FIG. 8, the carrier recovery apparatus in preferred embodiment 3 comprises a modulated signal input terminal 10, a complex multiplier 11, a phase error detector 12c, a loop filter 13, a numerical control oscillator 14, and a demodulated signal output terminal 15.

As shown in FIG. 8, the carrier recovery apparatus in preferred embodiment 3 is similar to the carrier recovery apparatus in preferred embodiment 1, except that the phase error detector 12a is replaced by the phase error detector 12c.

The other part of structure of the carrier recovery apparatus in preferred embodiment 3 is similar to that of the carrier recovery apparatus in preferred embodiment 1, and same parts are identified with same reference numerals and their explanation is omitted.

The operation of the phase error detector 12c different from the carrier recovery apparatus in preferred embodiment 1 is explained below by referring to FIG. 9.

Figure 9:
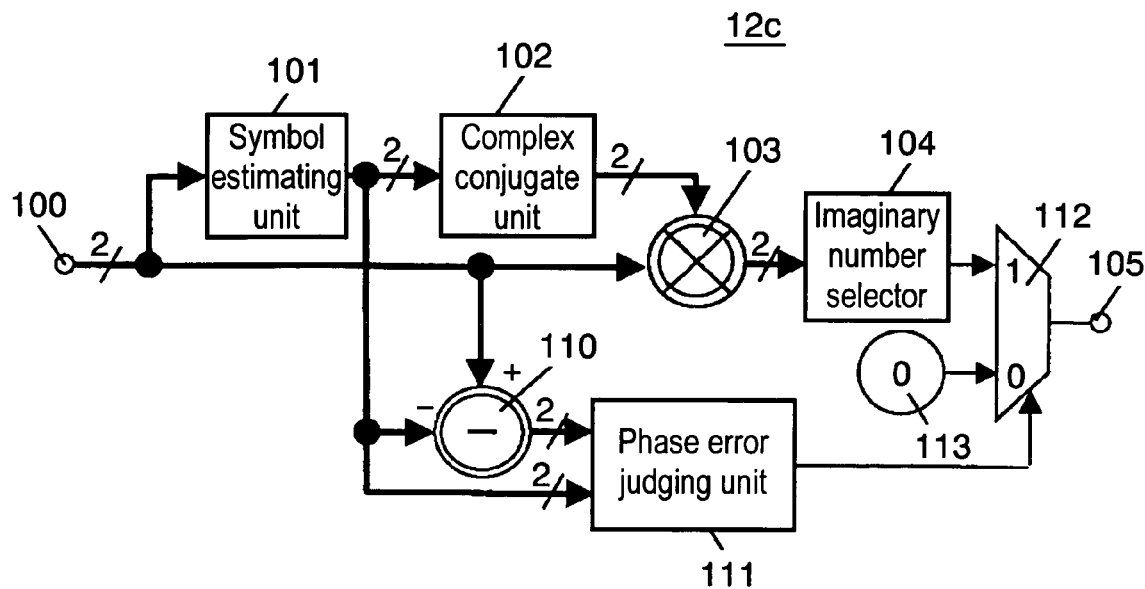
FIG. 9 is a block diagram showing an example of specific configuration of phase error detector 12c in the carrier recovery apparatus in preferred embodiment 3 of the invention.

FIG. 9 is a block diagram showing a specific configuration of the phase error detector 12c in the carrier recovery apparatus in FIG. 8.

In FIG. 9, the phase error detector 12c comprises a demodulated signal input terminal 100, a symbol estimating unit 101, a complex conjugate unit 102, a second complex multiplier 103, an imaginary number selector 104, a phase error output terminal 105, a complex subtractor 110, a phase error judging unit 111, a selector 112, and a constant generator 113.

The phase error detector 12c in carrier recovery in preferred embodiment 3 is similar to the phase error detector 12a of the carrier recovery apparatus in preferred embodiment 1, except that the complex subtractor 110, phase error judging unit 111, selector 112, and constant generator 113 are further added. The other configuration is same as the phase error detector 12a, and same components are identified with same reference numerals and the explanation is omitted.

In FIG. 9, the output (Di+jDq) of the symbol estimating unit 101 and the demodulated signal (Si+jSq) as the output of the complex multiplier 11 in FIG. 8 entered through the demodulated signal input terminal 100 are put into the complex subtractor 110. The complex subtractor 110 subtracts the output of the complex multiplier 11 and its symbol estimation result, and calculates the amplitude error (Ei+jEq) of I signal component and Q signal component of demodulated signal. This calculation is expressed in formula (9).

$$Ei+jEq=(Si-Di)+j(Sq-Dq) \tag{9}$$

The output (Ei+jEq) of the complex subtractor 110 and the output (Di+jDq) of the symbol estimating unit 101 are put into the phase error judging unit 111. The phase error judging unit 111 judges whether the phase error output from the imaginary number selector 104 is reliable as phase error or not on the basis of the both input signals. The selector 112 is controlled by the result of judgement of the phase error judging unit 111, and selects either one of the output from the imaginary number selector 104 and the output from the constant generator 113.

Figure 20A:
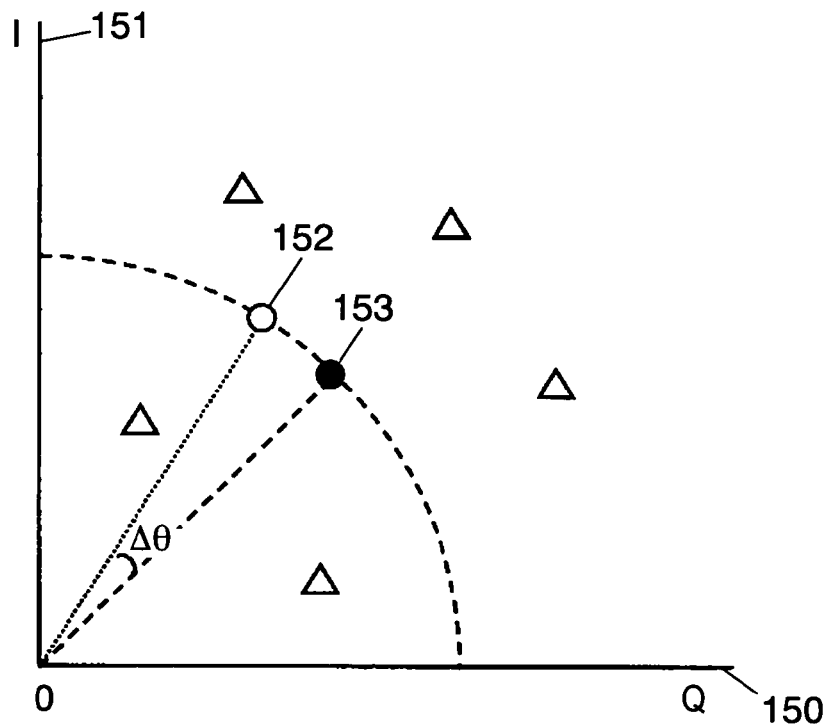
FIG. 20A and FIG. 20B are diagrams schematically explaining the demodulated signal diffused by noise or reflection.
Figure 20B:
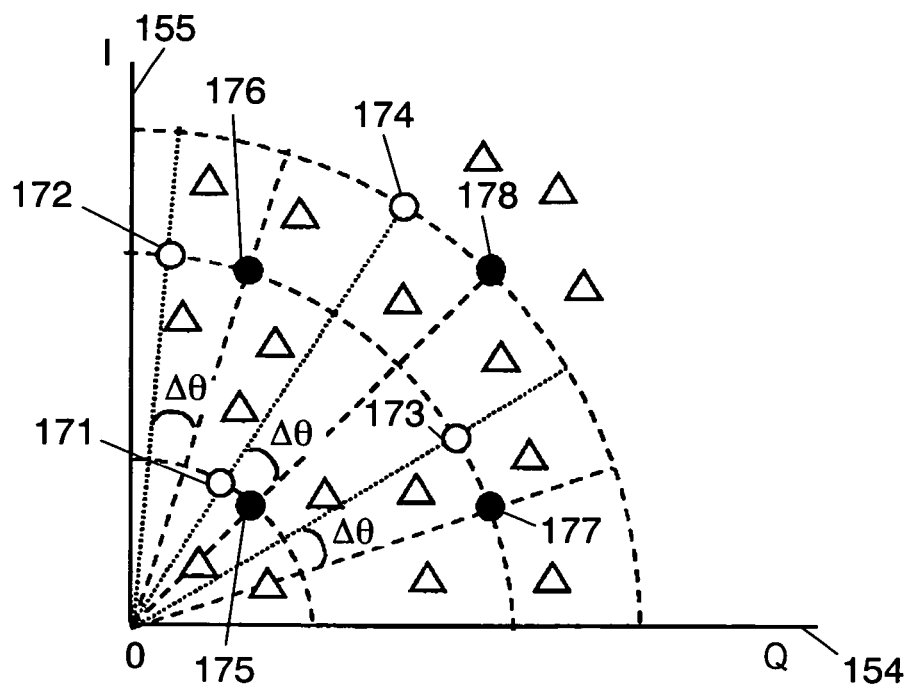

FIG. 20A and FIG. 20B show the mode of output signal of the complex multiplier 11 when interference signals such as noise and reflection are superposed on the quadrature modulation signal entered by way of the modulated signal input terminal 10 in FIG. 8. In FIG. 20A and FIG. 20B, I signal axes 150 and 154, Q signal axes 151 and 155, mark "●" 153 and 175 to 178, and mark "○" 152 and 171 to 174 are same as shown in FIG. 16 and FIG. 17, respectively. The transmitted original symbols, that is, mark "●" 153 and 175 to 178 move in the direction of phase error (Δθ), and are further diffused in the phase direction and amplitude direction by the interference signals of noise or reflection, thereby becoming reception signal indicated by mark "Δ". In case that the phase error is detected on the basis of such diffused reception symbol, the detected phase error is wrong, and the frequency capture becomes to be hard. If the frequency is captured and the phase is synchronized, a large phase jitter may take place. To avoid such problem, it is required to use only the phase error detected by the reception symbol rotated in the phase error direction in carrier recovery. For this purpose, in the embodiment shown in FIG. 9, the phase error judging unit 111 is provided for judging whether the phase error is detected or not by the reception symbol rotated in the phase error direction.

As the phase error judging unit 111 for judging the phase error detected by the reception symbol rotated in the phase error direction, two specific examples may be considered. These two embodiments are explained below.

(Example 1 of Phase Error Judging Unit 111)

Figure 22:
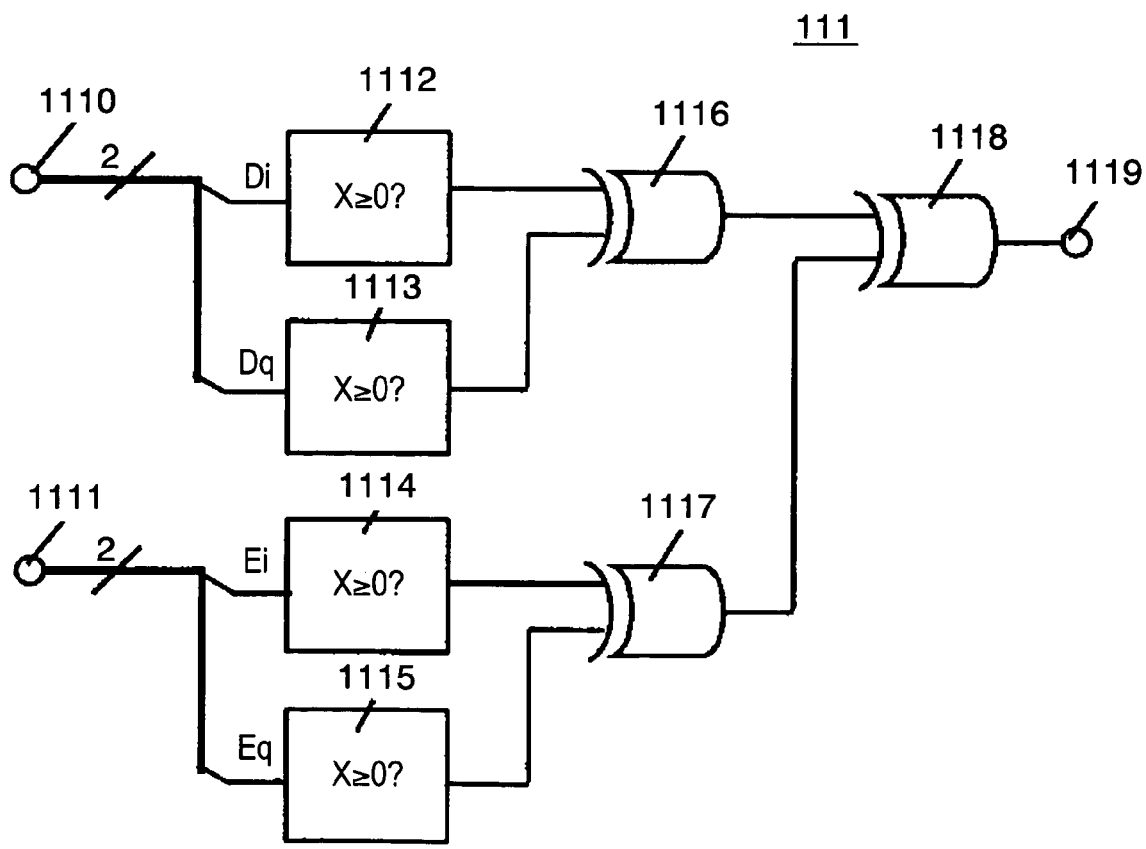
FIG. 22 is a block diagram showing a specific configuration of example 1 of phase error judging unit 111 in the carrier recovery apparatus in preferred embodiment 3 of the invention.
Figure 23A:
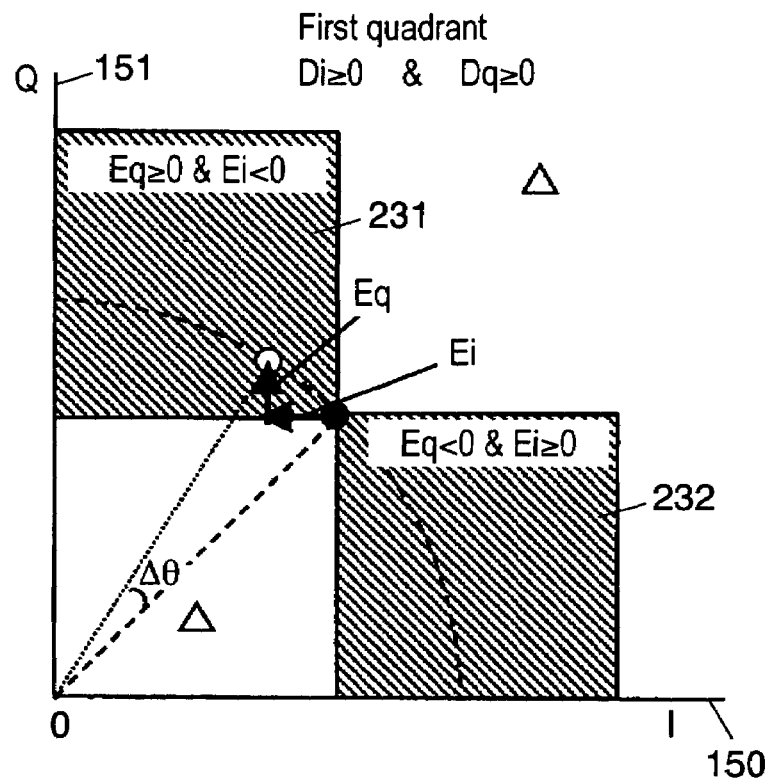
FIG. 23A and FIG. 23B are diagrams schematically explaining the operation of example 1 of phase error judging unit 111.
Figure 23B:
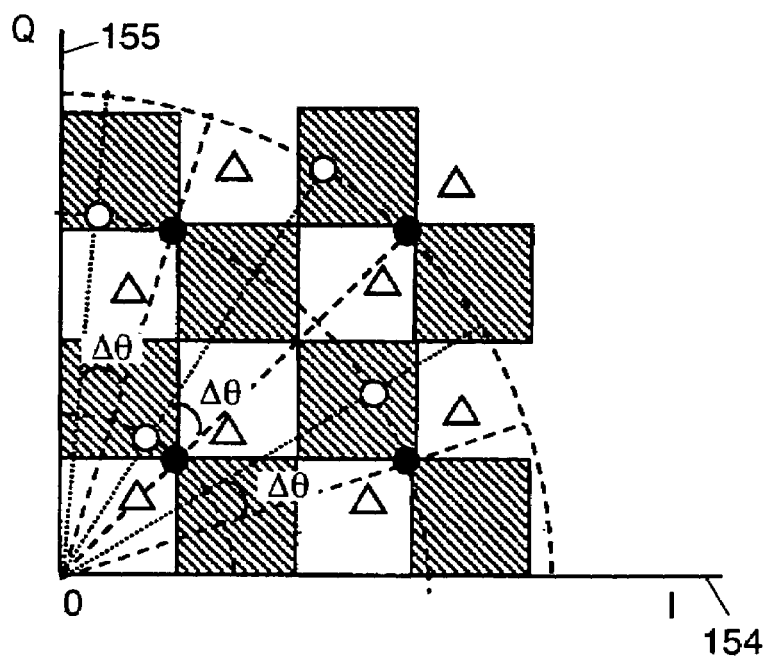

FIG. 22 is a block diagram showing a structure of example 1 of the phase error judging unit 111. FIG. 23A and FIG. 23B are signal space diagrams for explaining the operation of example 1 of the phase error judging unit 111. The operation of example 1 of the phase error judging unit 111 is explained below by referring to FIG. 22 and FIG. 23A and FIG. 23B. For the sake of simplicity of explanation, herein, in the case of 4PSK reception and 16QAM reception, the operation of example 1 of the phase error judging unit 111 is explained by referring to the first quadrant only. FIG. 23A shows a case of 4PSK and FIG. 23B is a case of 16QAM, but example 1 is not limited to 4PSK and 16QAM only.

Referring first to FIG. 23A and FIG. 23B, the principle of operation of embodiment 1 of the phase error judging unit 111 is described. In FIG. 23A, the I signal axis 150, Q signal axis 151, mark "○" and mark "●" are same as in FIG. 16, and detailed description is omitted. In FIG. 23B, similarly, the I signal axis 154, Q signal axis 155, mark "○" and mark "●" are same as in FIG. 17, and detailed description is omitted. Of the symbols output from the complex multiplier 11 in FIG. 8, the symbols rotated only in the phase error direction exist in regions 231 and 232 being shaded. Taking note of this point, the phase error judging unit 111 judges that the output of the imaginary number selector 104 is appropriate as the phase error signal when the demodulated signal as the output of the complex multiplier 11 gets into the shaded areas 231 and 232 in FIG. 23A, on the basis of the amplitude error (Ei+jEq) of the demodulated signal as the output of the complex subtractor 110 and the output (Di+jDq) of the symbol estimating unit 101. That is, the phase error judging unit 111 judges that the output of the imaginary number selector 104 is appropriate as the phase error signal if conforming to either (condition 1) or (condition 2) below.

(Condition 1)

Ei<0 and Eq≧0, or Ei≧0 and Eq<0 when the estimated symbol is in first quadrant (Di≧0 and Dq≧0) or third quadrant (Di<0 and Dq<0).

(Condition 2)

Ei≧0 and Eq≧0, or Ei<0 and Eq<0 when the estimated symbol is in second quadrant (Di<0 and Dq≧0) or fourth quadrant (Di≧0 and Dq<0).

Meanwhile, (Ei+jEq) is difference of the estimated symbol (Di+jDq) and the received symbol (Si+jSq). Therefore, in 4PSK, the region satisfying the above condition is shaded region 231 or 232 in FIG. 23A, in 16QAM, the region satisfying the above conditions is each shaded region in FIG. 23B.

FIG. 22 shows a configuration of the phase error judging unit 111 for realizing the above phase error judging operation. In FIG. 22, the output (Di+jDq) of the symbol estimating unit 101 and the output (Ei+jEq) of the complex subtractor 110 in FIG. 9 are put into input terminals 1110 and 1111 respectively. Comparators 1112, 1113, 1114, 1115 judge whether Di, Dq, Ei and Eq are respectively not less than 0. The outputs of the comparators 1112 and 1113 are put into an exclusive OR arithmetic unit 1116, and the outputs of the comparators 1114 and 1115 are put into an exclusive OR arithmetic unit 1117. The outputs of the exclusive OR arithmetic units 1116 and 1117 are put into an exclusive OR arithmetic unit 1118, and the exclusive OR is calculated.

In this constitution, only when the condition 1 or condition 2 is satisfied, the numerical value "1" showing it is appropriate as phase error is output from a phase error judgement terminal 1119. If neither the condition 1 nor condition 2 is satisfied, the numerical value "0" showing it is not appropriate as phase error is output from the phase error judgement terminal 1119.

(Example 2 of Phase Error Judging Unit 111)

Embodiment 1 is intended to judge the phase error by using the signs of the real part (Ei) and imaginary part (Eq) of the amplitude error (Ei+jEq) of the input signal as the output from the complex multiplier 110. The following is a method of judging the error in the phase direction more accurately.

Figure 24:
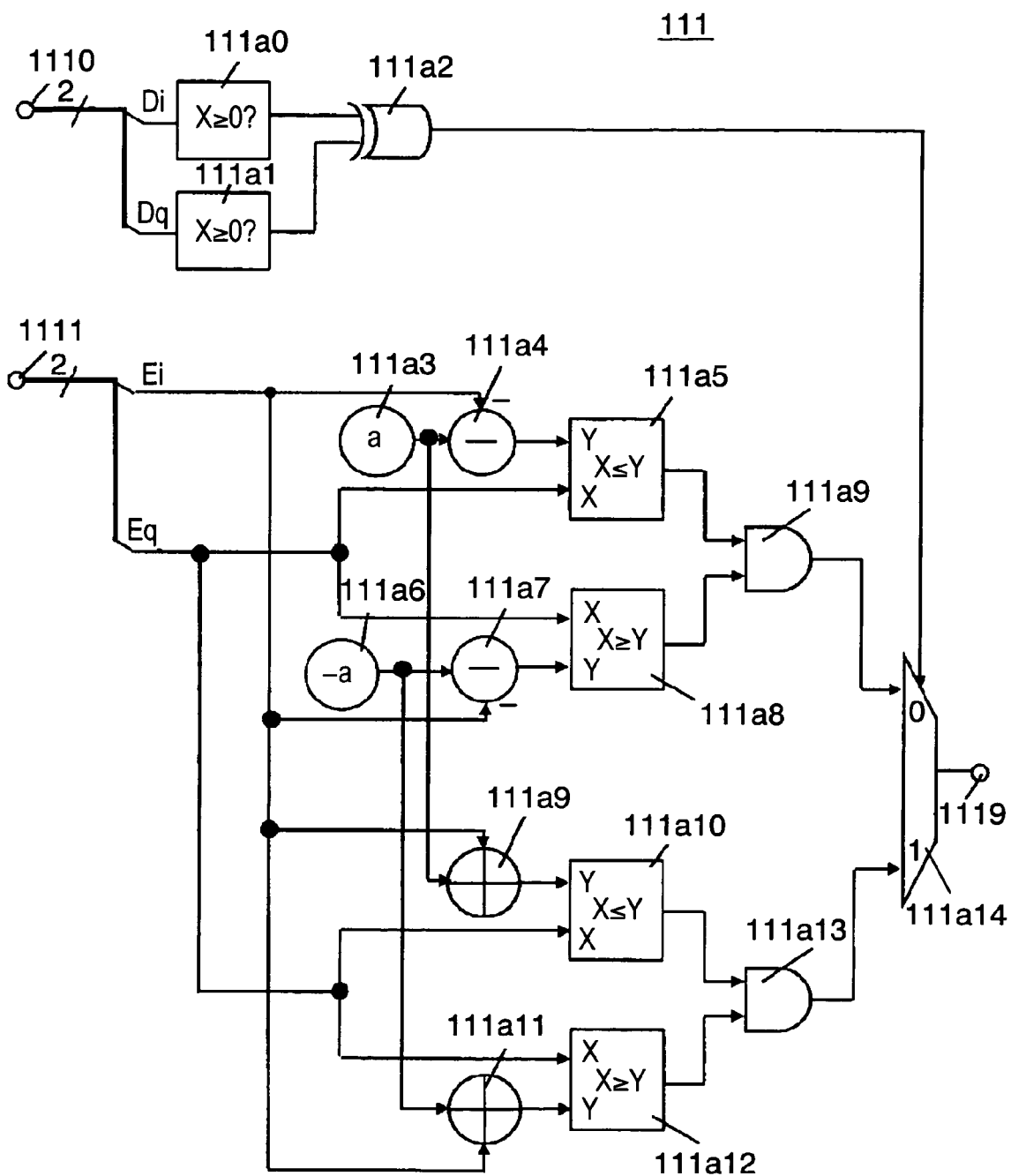
FIG. 24 is a block diagram showing a specific configuration of example 2 of phase error judging unit 111 in the carrier recovery apparatus in preferred embodiment 3 of the invention.
Figure 25A:
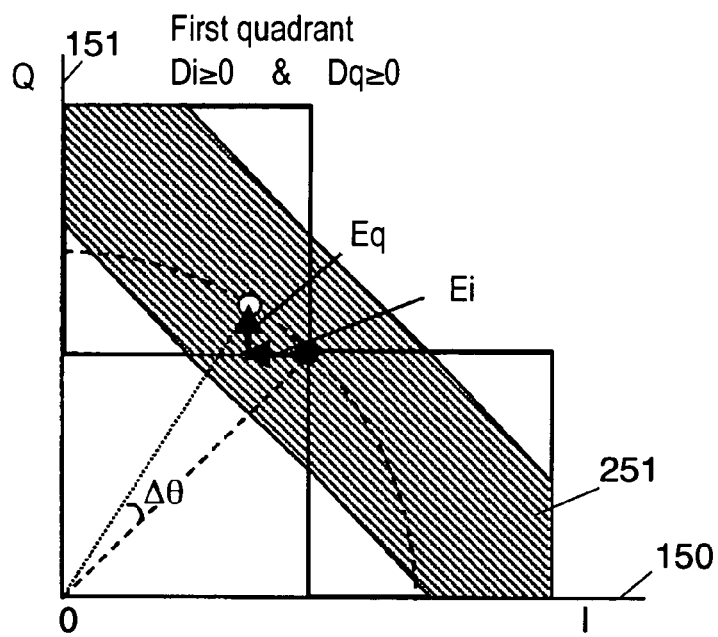
FIG. 25A, FIG. 25B, and FIG. 25C are diagrams schematically explaining the operation of example 2 of phase error judging unit 111.
Figure 25B:
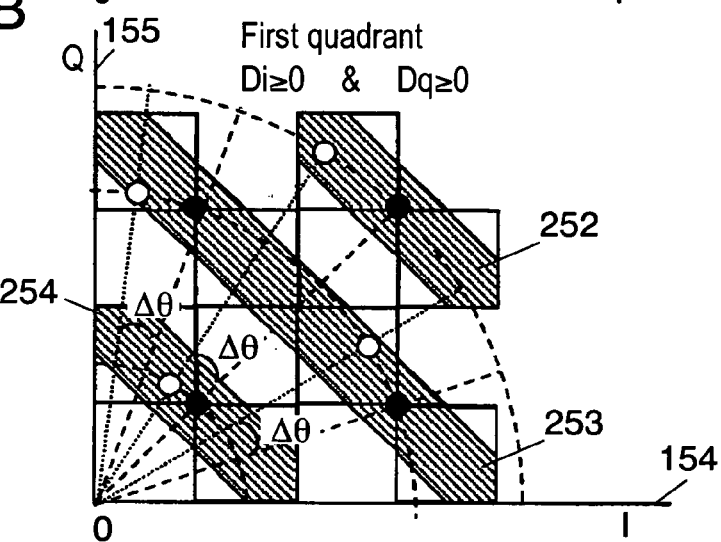
Figure 25C:
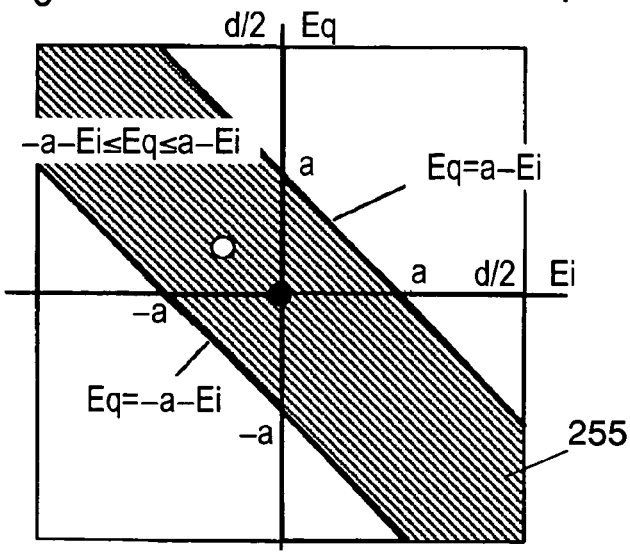

FIG. 24 is a block diagram showing a structure of example 2 of the phase error judging unit 111. FIG. 25A, FIG. 25B and FIG. 25C are signal space diagrams for explaining the operation of example 2 of the phase error judging unit 111. The operation of example 2 of the phase error judging unit 111 is explained below by referring to FIG. 24 and FIG. 25A, FIG. 25B and FIG. 25C. For the sake of simplicity of explanation, herein, in the case of 4PSK reception and 16QAM reception, the operation of example 2 of the phase error judging unit 111 is explained by referring to the first quadrant only. FIG. 24A shows a case of 4PSK and FIG. 24B shows a case of 16QAM, but example 2 is not limited to 4PSK and 16QAM only.

Referring first to FIG. 25A, FIG. 25B and FIG. 25C, the principle of operation of example 2 of the phase error judging unit 111 is described. In FIG. 25A, the I signal axis 150, Q signal axis 151, mark "○" and mark "●" are same as in FIG. 16, and detailed description is omitted. In FIG. 25B, similarly, the I signal axis 154, Q signal axis 155, mark "○" and mark "●" are same as in FIG. 17, and detailed description is omitted. Of the symbols output from the complex multiplier 11 in FIG. 8, the symbols rotated only in the phase error direction are present in regions 251 to 255 existing in shaded area. Taking note of this point, the phase error judging unit 111 judges that the output of the imaginary number selector 104 is appropriate as the phase error signal when the demodulated signal as the output of the complex multiplier 11 gets into the shaded areas 251 to 255 in FIG. 25A to FIG. 25C, on the basis of the amplitude error (Ei+jEq) of the input signal as the output of the complex subtractor 110 and the output (Di+jDq) of the symbol estimating unit 101. That is, the phase error judging unit 111 judges that the output of the imaginary number selector 104 is appropriate as the phase error signal if conforming to either (condition 3) or (condition 4) below.

(Condition 3)

$(-a-Ei) \leq Eq \leq (a-Ei)$, (where 0<a<minimum inter-code distance d), when the estimated symbol is in first quadrant ($Di \geq 0$ and $Dq \geq 0$) or third quadrant ($Di<0$ and $Dq<0$).

(Condition 2)

$(-a+Ei) \leq Eq \leq (a+Ei)$, (where 0<a<minimum inter-code distance d), when the estimated symbol is in second quadrant ($Di<0$ and $Dq \geq 0$) or fourth quadrant ($Di \geq 0$ and $Dq<0$).

Meanwhile, (Ei+jEq) is difference of the estimated symbol (Di+jDq) and the received symbol (Si+jSq). Therefore, in 4PSK, the region satisfying the above condition is shaded region 251 in FIG. 25A, in 16QAM, the region satisfying the above condition is each one of shaded regions 252 to 255 in FIG. 25B.

FIG. 25C is a magnified view around the transmission symbol in FIG. 25B.

FIG. 24 shows a configuration of the phase error judging unit 111 for realizing the above phase error judging operation. The output (Di+jDq) of the symbol estimating unit 101 and the output (Ei+jEq) of the complex subtractor 110 in FIG. 9 are put into input terminals 1110 and 1111 respectively. Being put into the input terminal 1110, Di and Dq are then put into comparators 111a0 and 111a1, and are judged to be not less than 0. The outputs of the comparators 111a0 and 111a1 are put into an exclusive OR arithmetic unit 111a2, and the exclusive OR arithmetic unit 111a2 calculates them by exclusive OR, and judges the quadrant of the output of the symbol estimating unit 101 (that is, the symbol output from the complex multiplier 11 in FIG. 8). That is, the exclusive OR arithmetic unit 111a2 judges whether the output of the symbol estimating unit 101 is present either in the first quadrant or third quadrant, or either in the second quadrant or fourth quadrant.

Of the output (Ei+jEq) of the complex multiplier 110 entered from the input terminal 1111, Ei is put into subtractors 111a4, 111a7, and adders 111a9, 111a11. On the other hand, Eq is put into comparators 111a5, 111a8, 111a10, and 111a12.

The subtractor 111a4 calculates (a−Ei) by subtracting the output value "a" of a constant generator 111a3 and the input Ei. The subtractor 111a7 calculates (−a−Ei) by subtracting the output value "−a" of a constant generator 111a6 and the input Ei. The output of the subtractor 111a4 is put into the comparator 111a5. The comparator 111a5 compares the output of the subtractor 111a4 and the input Eq in other input terminal of the comparator 111a5, and outputs "1" when $Eq \leq (a-Ei)$ is established. If not established, "0" is output. The output of the subtractor 111a7 is put into the comparator 111a8. The comparator 111a8 compares the output of the subtractor 111a7 and the input Eq in other input terminal of the comparator 111a8, and outputs "1" when $Eq \geq (-a-Ei)$ is established. If not established, "0" is output. The outputs of the comparator 111a5 and comparator 111a8 are put into an AND arithmetic unit 111a9. The AND arithmetic unit 111a9 calculates the AND of the outputs of the comparator 111a5 and comparator 111a8, and supplies the result to a selector 111a14.

On the other hand, the adder 111a9 adds the output value "a" of a constant generator 111a3 and Ei, and produces (a+Ei). The output of the adder 111a9 is put into the comparator 111a10. The adder 111a11 adds the output value "−a" of a constant generator 111a6 and Ei, and produces (−a+Ei). The output of the adder 111a11 is put into the comparator 111a12. The comparator 111a10 compares the output of the adder 111a9 and Eq put in its other input terminal, and outputs "1" when $Eq \leq (a+Ei)$ is established. If not established, "0" is output. The comparator 111a12 compares the output of the adder 111a11 and Eq put in other input terminal of the comparator 111a12, and outputs "1" when $Eq \geq (-a+Ei)$ is established. If not established, "0" is output. The outputs of the comparator 111a10 and comparator 111a12 are put into an AND arithmetic unit 111a13. The AND arithmetic unit 111a13 calculates the AND of the outputs of the comparator 111a10 and comparator 111a12, and supplies the result to the selector 111a14.

The selector 111a14, using the output of the exclusive OR arithmetic unit 1111a2 as the control signal, selects one of the two input signals. When the output of the symbol estimating unit 101 (that is, the symbol output from the complex multiplier 11 in FIG. 8) is in the first or third quadrant, that is, when the exclusive OR arithmetic unit 1111a2 outputs "0", the selector 111a14 selects the output of the AND arithmetic unit 111a9 and outputs it. When the output of the symbol estimating unit 101 is in the second or fourth quadrant, that is, when the exclusive OR arithmetic unit 1111a2 outputs "1", the selector 111a14 selects the output of the AND arithmetic unit 111a13 and outputs it. The output of the selector 111a14 is fed to the output terminal 1119 as the phase error judging result.

The output signal of the output terminal 111 shown in examples 1 and 2 is put into the selector 112 in FIG. 9. When the output of the imaginary number selector 104 is appropriate as a phase error signal, the selector 112 feeds the output of the imaginary number selector 104 to the phase error output terminal 105. When the output of the imaginary number selector 104 is not appropriate as a phase error signal, the selector 112 feeds "0" that is the output of the constant generator 113 to the phase error output terminal 105. The phase error judging unit 111 thus controls the selector 112.

Thus, according to the carrier recovery apparatus in preferred embodiment 3 of the invention, since the phase error of quadrature modulation signal can be detected by a simple calculation, the required circuit scale is smaller. Moreover, in the reception status disturbed by noise or reflection, the frequency capture characteristic and phase jitter characteristic can be improved.

Other configuration of the phase error detector 12c in the carrier recovery apparatus in preferred embodiment 3 of the invention shown in FIG. 8 is described below while referring to FIG. 10.

Figure 10:
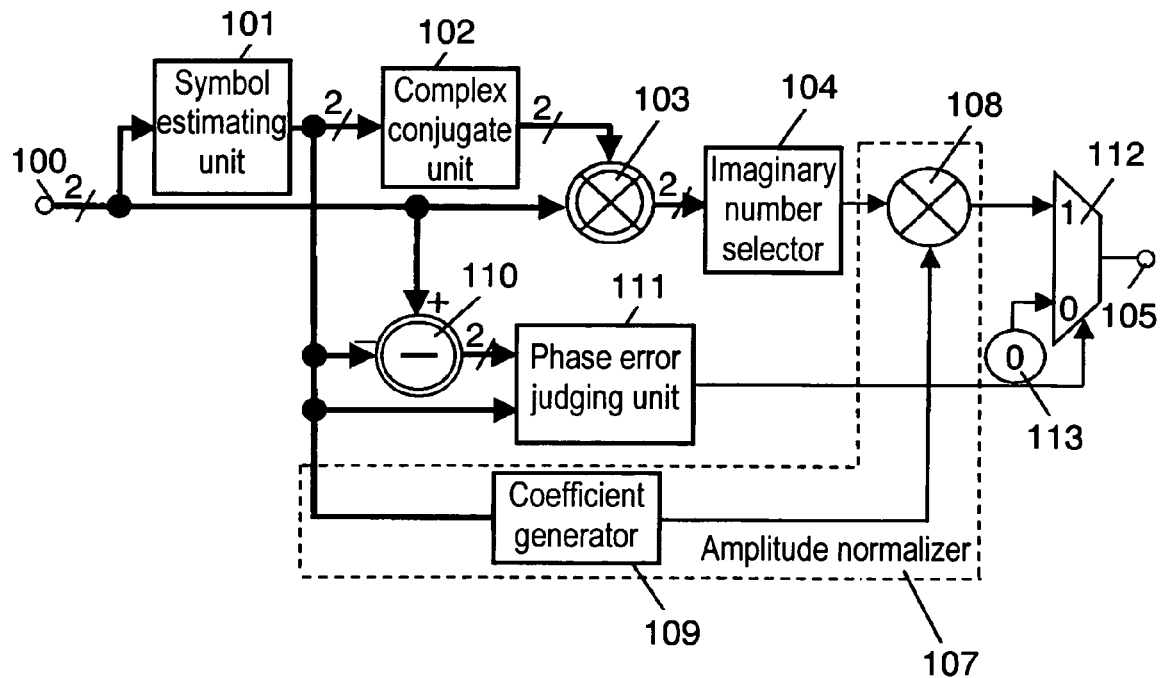
FIG. 10 is a block diagram showing an example of specific configuration of phase error detector 12c in the carrier recovery apparatus in preferred embodiment 3 of the invention.

FIG. 10 is similar to the phase error detector 12b of the carrier recovery apparatus in preferred embodiment 2, except that a complex subtractor 110, a phase error judging unit 111, a selector 112, and a constant generator 113 are further added. In FIG. 10, same parts as in FIG. 7 or FIG. 9 are identified with same reference numerals, and the individual explanation is omitted.

The structure shown in FIG. 10 obviously has the same effects. In this case, when receiving quadrature amplitude modulation (QAM) signals composed of a greater number of symbols, the frequency capture characteristic and phase jitter characteristic are further improved.

The phase error judging unit 111 in FIG. 9 and FIG. 10 judges the quadrant by using the output of the symbol estimating unit 101, but same effects are obtained by using the demodulated signal which is the output of the complex multiplier 11 entered from the demodulated signal input terminal 100.

In the phase error detector 12c shown in FIG. 9 and FIG. 10, the components of the symbol estimating unit 101, complex conjugate unit 102, second complex multiplier 103, and imaginary number selector 104 are explained on the basis of the phase error detector 12a in FIG. 2 in preferred embodiment 1. But same effects are obviously obtained in the phase error detector 12a in the configuration shown in FIG. 3 or FIG. 4.

The foregoing explanation relates to embodiments of 4PSK and 16QAM, but same effects are obviously obtained by other phase shift keying (nPSK) or quadrature amplitude modulation (nQAM, etc.).

Preferred Embodiment 4

A carrier recovery apparatus in preferred embodiment 4 of the invention is similar to the carrier recovery apparatus in preferred embodiment 1, preferred embodiment 2, and preferred embodiment 3, except that the phase error can be detected accurately even by the symbol at the outermost side (hereinafter called outermost symbol) when receiving 16QAM, 64QAM, 256QAM, 1024QAM, etc. (that is, (2^2n) QAM, n=2, 3, 4, 5, . . . ). Further, in the reception status disturbed by noise or reflection, the frequency capture characteristic and the phase jitter characteristic are improved.

The carrier recovery apparatus in preferred embodiment 4 of the invention is explained below.

Figure 26:
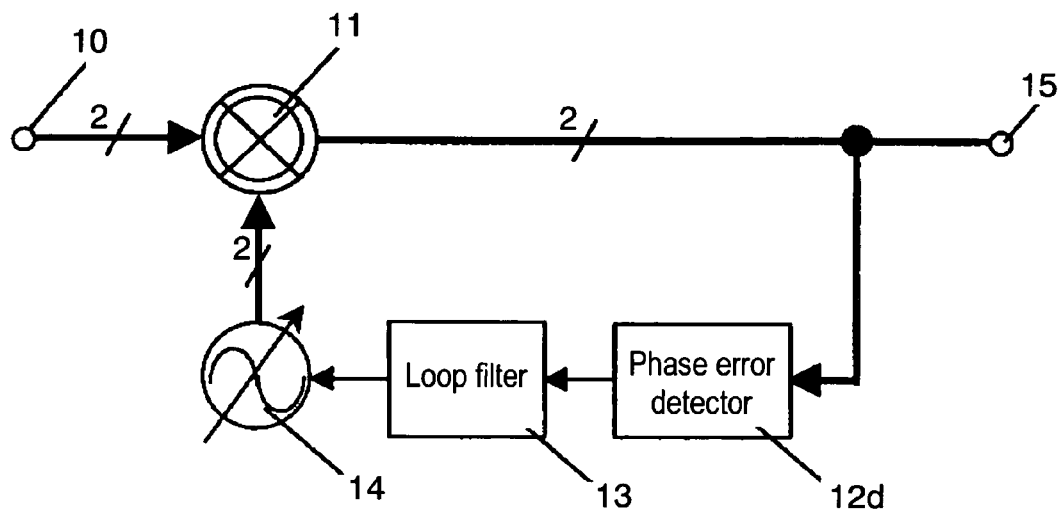
FIG. 26 is a block diagram showing a configuration of carrier recovery apparatus in preferred embodiment 4 of the invention.

FIG. 26 is a block diagram showing a configuration of the carrier recovery apparatus in preferred embodiment 4 of the invention. In FIG. 26, the carrier recovery apparatus in preferred embodiment 4 comprises a modulated signal input terminal 10, a complex multiplier 11, a phase error detector 12d, a loop filter 13, a numerical control oscillator 14, and a demodulated signal output terminal 15.

As shown in FIG. 26, the carrier recovery apparatus in preferred embodiment 4 is similar to the carrier recovery apparatus in preferred embodiment 1, except that the phase error detector 12a is replaced by the phase error detector 12d.

The other structure of the carrier recovery apparatus in preferred embodiment 4 is similar to that of the carrier recovery apparatus in preferred embodiment 1, and same parts are identified with same reference numerals and their explanation is omitted.

The operation of the phase error detector 12d different from the carrier recovery apparatus in preferred embodiment 1 is explained below by referring to FIG. 27.

Figure 27:
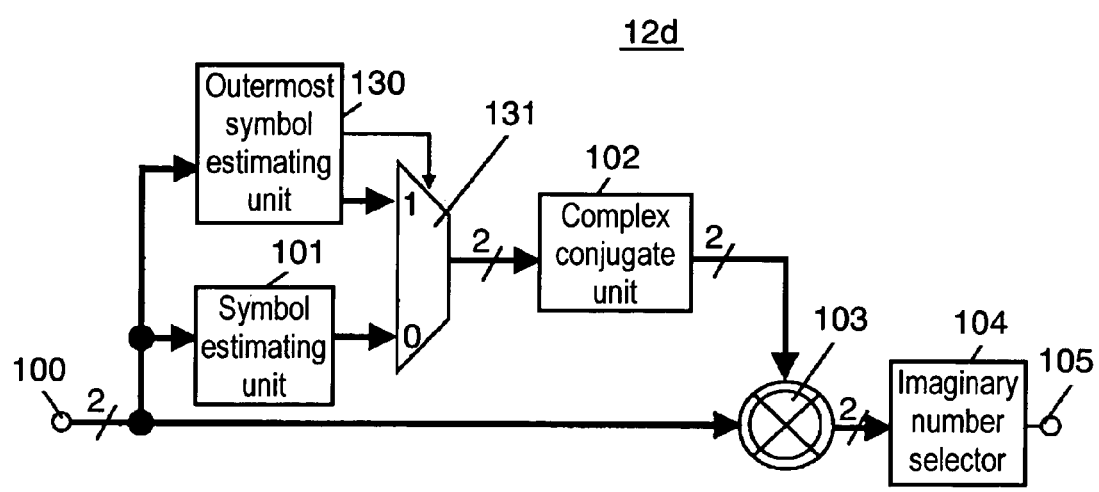
FIG. 27 is a block diagram showing an example of specific configuration of phase error detector 12d in the carrier recovery apparatus in preferred embodiment 4 of the invention.

FIG. 27 is a block diagram showing a specific configuration of the phase error detector 12d in the carrier recovery apparatus in FIG. 26.

In FIG. 27, the phase error detector 12d comprises a demodulated signal input terminal 100, a symbol estimating unit 101, a complex conjugate unit 102, a second complex multiplier 103, an imaginary number selector 104, a phase error output terminal 105, an outermost symbol estimating unit 130, and a selector 131.

The phase error detector 12d is similar to the phase error detector 12a of the carrier recovery apparatus in preferred embodiment 1, except that the outermost symbol estimating unit 130 and selector 131 are further added. The other configuration is same as the phase error detector 12a, and same components are identified with same reference numerals and the explanation is omitted.

In FIG. 27, the demodulated signal (Si+jSq) entered through the demodulated signal input terminal 100 is put into the outermost symbol estimating unit 130.

Figure 28:
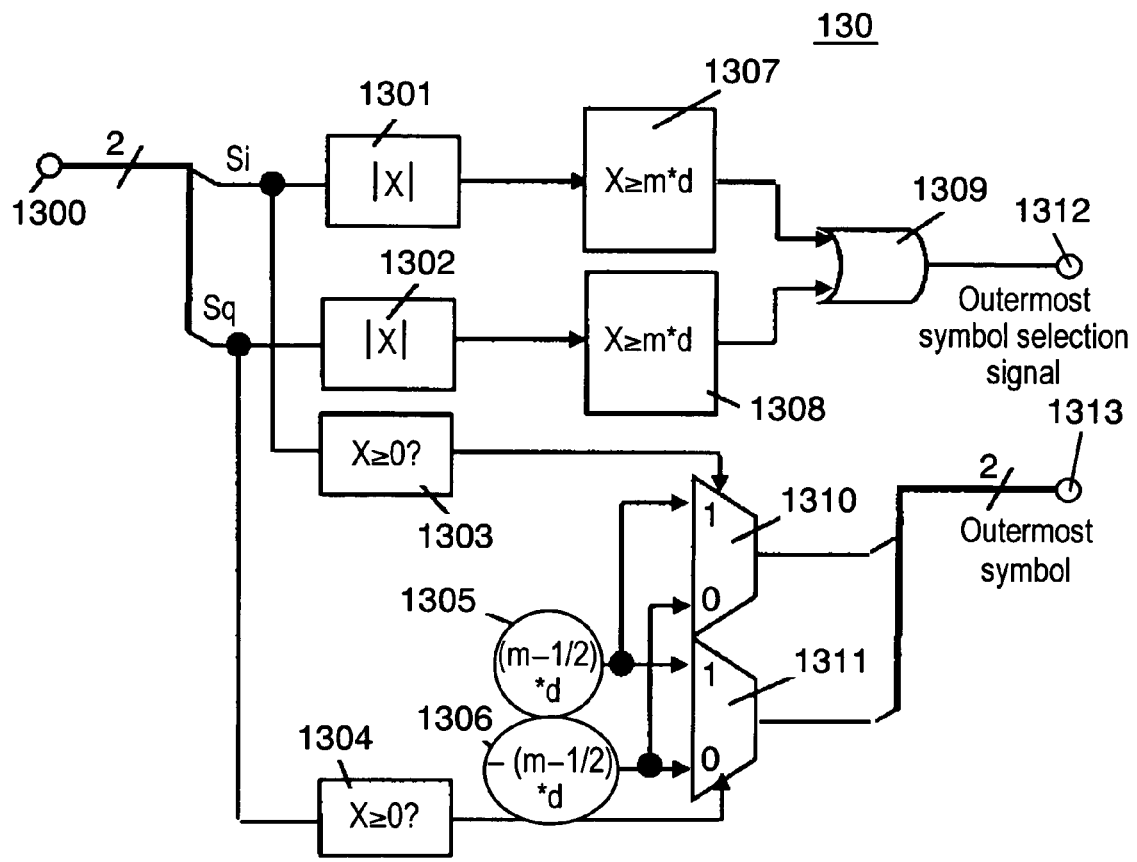
FIG. 28 is a block diagram showing an example of specific configuration of outermost symbol estimating unit 130 in the carrier recovery apparatus in preferred embodiment 4 of the invention.
Figure 29:
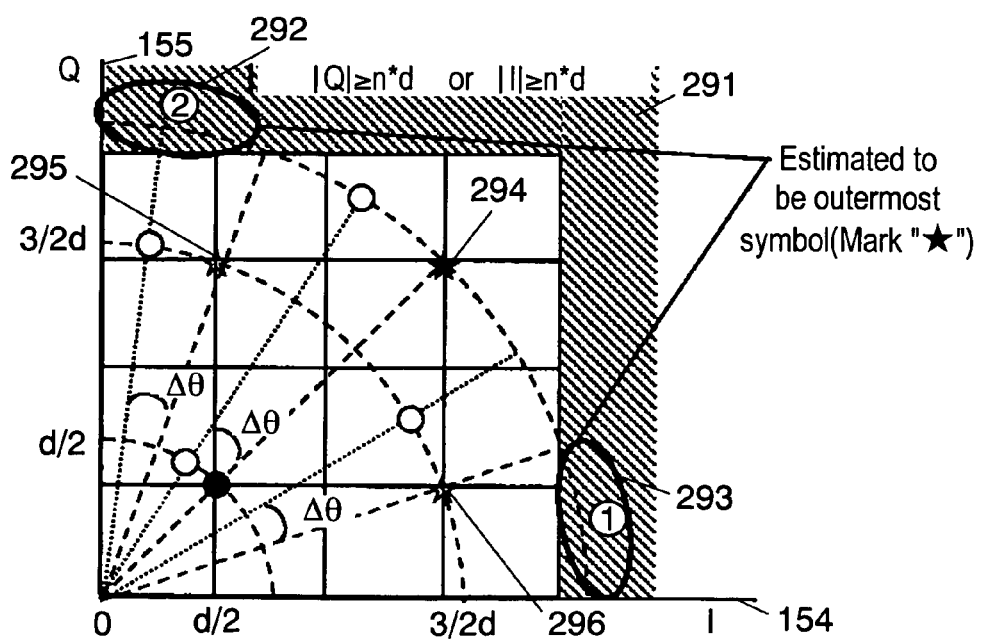
FIG. 29 is a diagram schematically explaining the operation of outermost symbol estimating unit 130.
Figure 30:
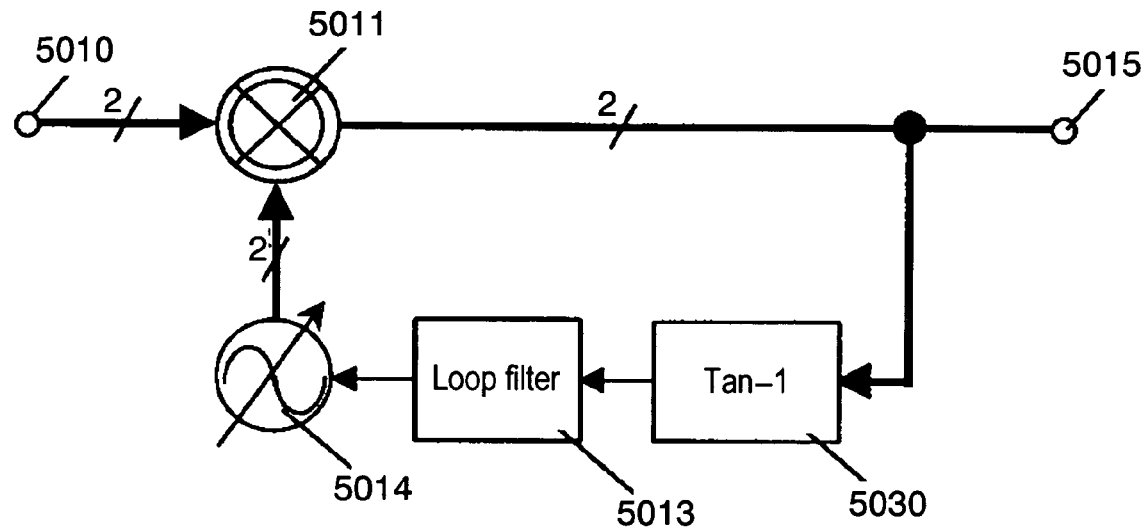
FIG. 30 is a block diagram showing a configuration of carrier recovery apparatus in a prior art.
Figure 31:
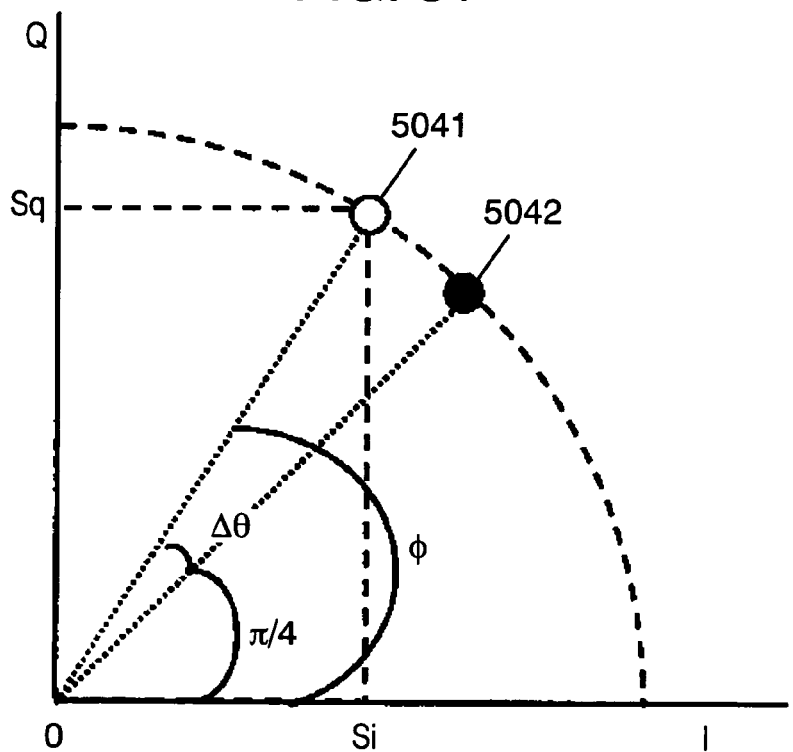
FIG. 31 is a diagram schematically explaining the operation of arc tangent arithmetic unit 30 in the carrier recovery apparatus in the prior art.

FIG. 28 is a further specific block diagram of the outermost symbol estimating unit 130, and FIG. 29 is a signal space diagram for explaining the operation of the outermost symbol estimating unit 130. The operation of the outermost symbol estimating unit 130 is explained below while referring to FIG. 28 and FIG. 29.

In FIG. 28, of the output (Si+jSq) of the complex multiplier 11 entered in the input terminal 1300, Si is put into an absolute value calculator 1301 and Sq into an absolute value calculator 1302, respectively. The absolute value calculator 1301 calculates the absolute value of Si. The absolute value calculator 1302 calculates the absolute value of Sq. The output of the absolute value calculator 1301 is put into a comparator 1307, and the output of the absolute value calculator 1302 is put into a comparator 1308. The comparator 1307 outputs "1" when $|Si| \geq m*d$ is satisfied, and outputs "0" when not satisfied. The comparator 1308 outputs "1" when $|Sq| \geq m*d$ is satisfied, and outputs "0" when not satisfied. Herein, m is $2^{(n-1)}$ in the case of $(2^2n)$ QAM (n=2, 3, 4, . . . ), and d is the minimum inter-code distance. An OR arithmetic unit 1309 calculates OR of the output of the comparator 1307 and the output of the comparator 1308, and outputs the outermost symbol selection signal through an outermost symbol selection signal output terminal 1312.

This operation is explained by referring to the space diagram in FIG. 29. In FIG. 29, I signal axis 154, Q signal axis 155, mark "●", and mark "○" are same as I signal axis 154, Q signal axis 155, mark "●", and mark "○" shown in FIG. 17, respectively, and individual explanations are omitted.

The outermost symbol selection signal output from the outermost symbol selection signal output terminal 1312 shows whether the output (Si+jSq) of the complex multiplier 11 entered in the input terminal 1300 is present in region 291 indicated in shaded area or not.

Of the output (Si+jSq) of the complex multiplier 11 entered in the input terminal 1300, Si is put in a comparator 1303 and Sq is put in a comparator 1304, respectively. The comparator 1303 outputs "1" when the input Si is 0 or more, or outputs "0" otherwise. The comparator 1304 outputs "1" when the input Sq is 0 or more, or outputs "0" otherwise. The output of the comparator 1303 is supplied into a selector 1310 as selection signal of the selector 1310, and the output of the comparator 1304 is supplied into a selector 1311 as selection signal of the selector 1311. In the selectors 1310 and 1311, the positive amplitude value of the outermost symbol and the negative amplitude value of the outermost symbol are entered.

The positive amplitude value of the outermost symbol is $(m-1/2)*d$. Herein, m is $2^{(n-1)}$ in the case of $(2^2n)$ QAM (n=2, 3, 4, . . . ), and d is the minimum inter-code distance. The positive amplitude value of the outermost symbol is the output of a constant generator 1305.

The negative amplitude value of the outermost symbol is $-(m-1/2)*d$. Herein, m is $2^{(n-1)}$ in the case of $(2^2n)$ QAM (n=2, 3, 4, . . . ), and d is the minimum inter-code distance. The negative amplitude value of the outermost symbol is the output of a constant generator 1306.

The selector 1310 is controlled by the output of the comparator 1303 (that is, the sign of Si), and selects either one of the output $((m-1/2)*d)$ of the constant generator 1305 or the output $(-(m-1/2)*d)$ of the constant generator 1306. The selector 1311 is controlled by the output of the comparator 1304 (that is, the sign of Sq), and selects either one of the output $((m-1/2)*d)$ of the constant generator 1305 or the output $(-(m-1/2)*d)$ of the constant generator 1306. The output of the selector 1310 and output of the selector 1311 are output as estimated outermost symbols through an outermost symbol output terminal 1313.

The estimated outermost symbols output from the outermost symbol output terminal 1313 and the output of the symbol estimating unit 101 are put into the selector 131 in FIG. 27. The selector 131 is controlled by the outermost symbol selection signal supplied from the outermost symbol selection signal output terminal 1312 in FIG. 28, and selects either one of the estimated outermost symbol and the output of the symbol estimating unit 101. The output of the selector 131 is output to the complex conjugate unit 102.

The operation of the outermost symbol estimating unit 130 and selector 131 is schematically explained on the signal space diagram in FIG. 29. The outermost symbol selection signal output from the outermost symbol selection signal output terminal 1312 is a signal showing whether the output (Si+jSq) of the complex multiplier 11 is present within the region 291 in shaded area in FIG. 29 or not. If (Si+jSq) is present within the region 291 in shaded area, the selector 131 is controlled by the outermost symbol estimating unit 130, and the outermost symbol output from the outermost symbol selection signal output terminal 1313 is output to the complex conjugate unit 102 as estimated symbol. That is, the symbol indicated by mark "*" 294 in FIG. 29 is outputd as estimated symbol to the complex conjugate unit 102. If phase rotation is left over in the output (Si+jSq) of the complex multiplier 11, the outermost symbol may be present in region 292 or region 293 in FIG. 29. In such a case, however, the estimated symbol is not the closest symbol (that is, symbol 295 or 296 indicated by mark "☆" in FIG. 29), but the outermost symbol (that is, symbol 294 indicated by mark "★" in FIG. 29). As a result, the phase error can be detected correctly.

Thus, according to the carrier recovery apparatus in preferred embodiment 4 of the invention, since the phase error of quadrature modulation signal can be detected by simple calculation, the required circuit scale is smaller. Moreover, when receiving 16QAM, 64QAM, 256QAM, 1024QAM, etc. (that is, $(2^2n)$QAM, n=2, 3, 4, 5, . . . ), in the reception status disturbed by noise or reflection, the frequency capture characteristic and phase jitter characteristic can be improved.

Meanwhile, if the phase error detector 12*d* in the carrier recovery apparatus in preferred embodiment 4 of the invention shown in FIG. 26 is replaced by the phase error detector 12*b* in the carrier recovery apparatus in preferred embodiment 2 or the phase error detector 12*c* in the carrier recovery apparatus in preferred embodiment 3, and is further combined with the outermost symbol estimating unit 130 and selector 131, the same effects are obviously obtained. In this case, when receiving the quadrature amplitude modulation (QAM) signals, the frequency capture characteristic and phase jitter characteristic are further improved.

In the phase error detector 12*d* shown in FIG. 26, the symbol estimating unit 101, complex conjugate unit 102, second complex multiplier 103 and imaginary number selector 104 are explained in the basis of the phase error detector 12*a* in FIG. 2 in preferred embodiment 1. Same effects are obviously obtained in the phase error detector 12*a* shown in FIG. 3 or FIG. 4.

Preferred Embodiment 5

A carrier recovery apparatus in preferred embodiment 5 of the invention is similar to the carrier recovery apparatus in preferred embodiment 1, preferred embodiment 2, preferred embodiment 3, and preferred embodiment 4, except that the frequency capture range is further expanded.

The carrier recovery apparatus in preferred embodiment 5 of the invention is explained below.

Figure 11:
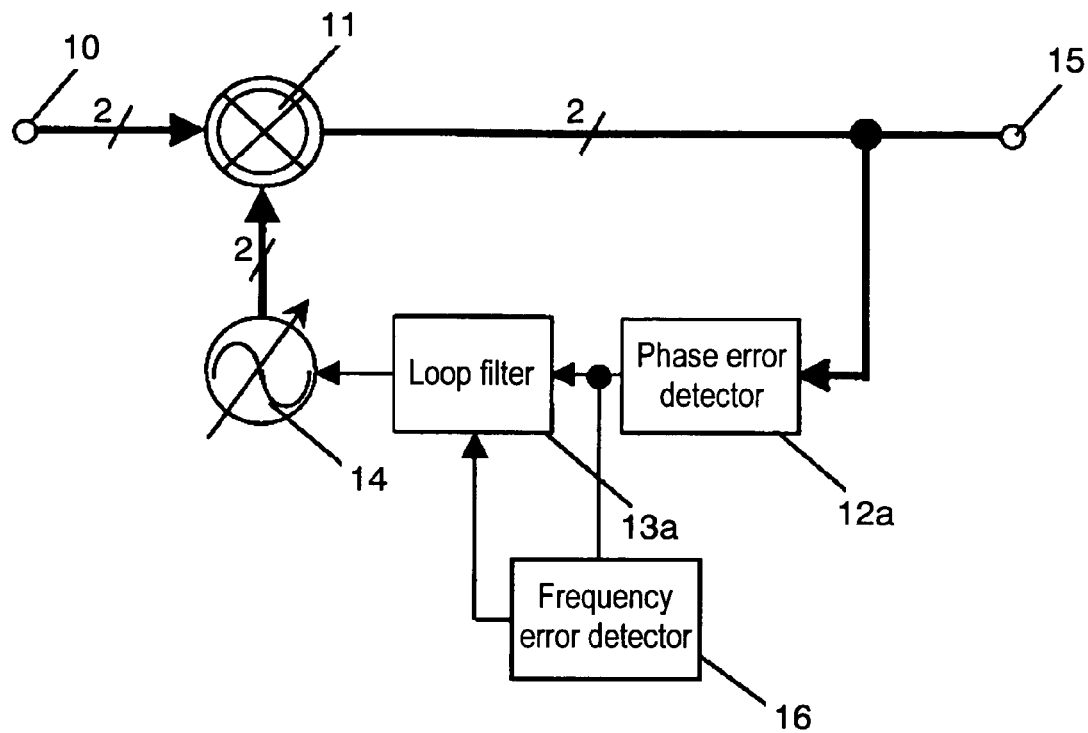
FIG. 11 is a block diagram showing a configuration of carrier recovery apparatus in preferred embodiment 5 of the invention.

FIG. 11 is a block diagram showing a configuration of the carrier recovery apparatus in preferred embodiment 5 of the invention. In FIG. 11, the carrier recovery apparatus in preferred embodiment 5 comprises a modulated signal input terminal 10, a complex multiplier 11, a phase error detector 12*a*, a frequency error detector 16, a loop filter 13*a*, a numerical control oscillator 14, and a demodulated signal output terminal 15. As shown in FIG. 11, the carrier recovery apparatus in preferred embodiment 5 is similar to the carrier recovery apparatus in preferred embodiment 1, except that a frequency error detector 16 is further added and that the loop filter 13 is replaced by the loop filter 13*a*.

The other structure than the frequency error detector 16 and loop filter 13*a* of the carrier recovery apparatus in preferred embodiment 5 is similar to that of the carrier recovery apparatus in preferred embodiment 1, and same parts are identified with same reference numerals and their explanation is omitted.

The operation of the frequency error detector 16 and loop filter 13*a* different from the carrier recovery apparatus in preferred embodiment 1 is described below.

In FIG. 11, the phase error signal output from the phase error detector 12*a* is put into the loop filter 13*a*, and is also fed into the frequency error detector 16. The output of the frequency error detector 16 is put into the loop filter 13*a*. The loop filter 13*a* combines the output of the frequency error detector 16 and the phase error signal output from the phase error detector 12*a*, and removes high frequency components, and supplies it as control signal into the numerical control oscillator 14.

Figure 12:
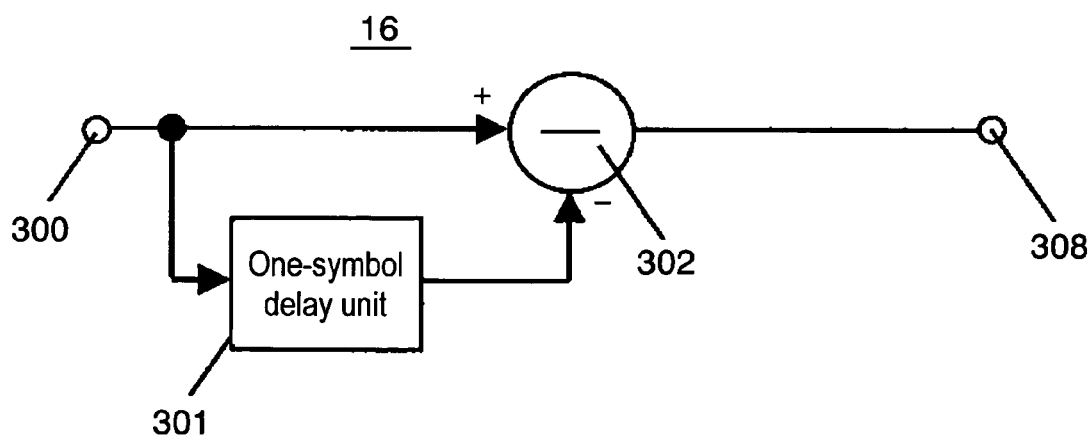
FIG. 12 is a block diagram showing an example of specific configuration of frequency error detector 16 in the carrier recovery apparatus in preferred embodiment 5 of the invention.

FIG. 12 is a further specific block diagram of the frequency error detector 16 in the carrier recovery apparatus in FIG. 11. The operation of the frequency error detector 16 is explained by referring to FIG. 12.

In FIG. 12, the frequency error detector 16 includes a phase error input terminal 300, a one-symbol delay unit 301, a subtractor 302, and a frequency error output terminal 308. The phase error signal entered from the phase error input terminal 300 is put into the one-symbol delay unit 301, and delayed by one symbol period, and is put into the subtractor 302. The subtractor 302 calculates the difference of the output signal of the one-symbol delay unit 301 and the phase error signal entered from the phase error input terminal 300 at present, and outputs the result by way of the frequency error output terminal 308.

Figure 21:
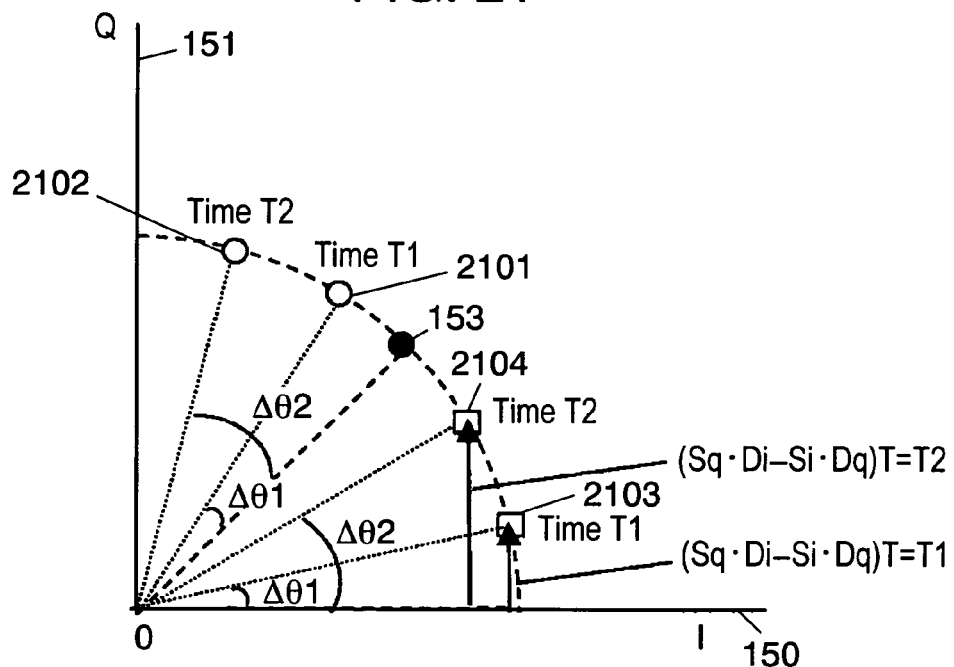
FIG. 21 is a diagram schematically explaining the operation of frequency error detector 16.

FIG. 21 shows the operation of the frequency error detector 16 schematically on a signal space diagram. Herein, the digital-modulated signal to be received is assumed to be 4PSK, and only the first quadrant is shown for the sake of simplicity of explanation. Referring to FIG. 21, the frequency error detection operation of the frequency error detector 16 is explained.

In FIG. 21, I signal axis 150, Q signal axis 151, and symbol 153 shown as mark "●" are same as I signal axis 150, Q signal axis 151, and symbol 153 shown as mark "●" in FIG. 16, and detailed description is omitted. Symbols 2101 and 2102 shown as mark "○" are output signals of the complex multiplier 11 when the input signal through the modulated signal input terminal 10 in FIG. 11 and the output signal of the numerical control oscillator 14 have a frequency error, and symbol 2101 is a symbol appearing at time T1, and symbol 2102 is a symbol appearing at time T2. The symbol 2102 is a symbol incoming next to the symbol 2101. These modulated signals are supposed to have a frequency error (Δf) with respect to the output signal of the numerical control oscillator 14. Because of the frequency error (Δf), the phase difference between the received quadrature modulation signal and the original symbol is shifted from Δθ1 to Δθ2 in the period of one symbol. This frequency error (Δf) and phase error change amount (Δθ2−Δθ1) can be expressed in formula (10).

$$2\cdot\pi\cdot\Delta f\cdot T=(\Delta\theta 2-\Delta\theta 1) \quad (10)$$

where T=T2−T1.

As understood from formula (10), the phase error change amount (Δθ2−Δθ1) is proportional to the frequency error (Δf).

The output of the phase error detector 12a is the Q signal axis components of the coordinates expressed by symbols 2103 and 2104 shown as mark "□" in FIG. 21. The output of the phase error detector 12a is also changed, due to the presence of frequency error (Δf), by $\{(Sq\cdot Di-Si\cdot Dq)_{T=T2}-(Sq\cdot Di-Si\cdot Dq)_{T=T1}\}$ in the period of one symbol (T=T2−T1). That is, the value is proportional to the frequency error (Δf). Meanwhile, $(Sq\cdot Di-Si\cdot Dq)_{T=T2}$ refers to (Sq·Di−Si·Dq) when the time T is T2. Similarly, $(Sq\cdot Di-Si\cdot Dq)_{T=T1}$ refers to (Sq·Di−Si·Dq) when the time T is T1. Therefore, by calculating the time-course error of the phase error signal detected by the phase error detector 12a, the frequency error can be detected.

Figure 14:
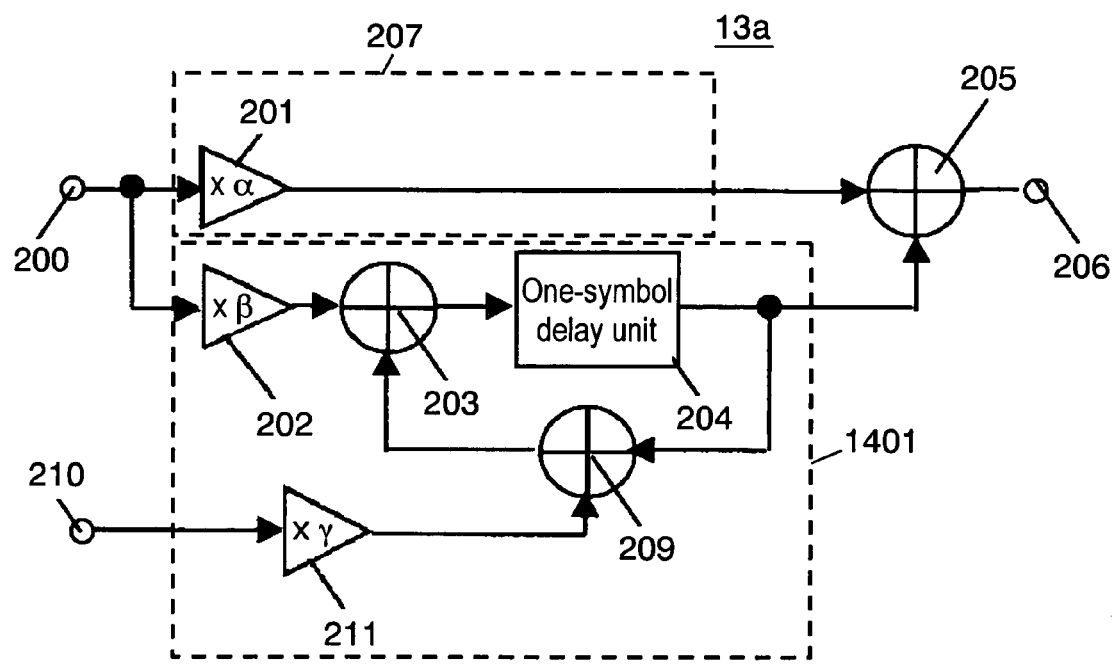
FIG. 14 is a block diagram showing a specific configuration of loop filter 13a in the carrier recovery apparatus in preferred embodiment 5 of the invention.

The output of the frequency error detector 16 is put into the loop filter 13a. FIG. 14 is a block diagram showing a specific configuration of the loop filter 13a. In FIG. 14, the loop filter 13a comprises a phase error signal input terminal 200, a direct system amplifier 201, an integral system amplifier 202, a first adder 203, a one-symbol delay unit 204, a second adder 205, a third adder 209, a frequency error amplifier 211, a frequency error input terminal 210, and a control signal output terminal 206.

As shown in FIG. 14, the loop filter 13a in the carrier recovery in preferred embodiment 5 is similar to the loop filter 13 in the carrier recovery apparatus in preferred embodiment 1, except that the third adder 209, frequency error amplifier 211 and frequency error input terminal 210 are further comprised, and the other configuration is same as in the loop filter 13, and same parts are identified with same reference numerals and their description is omitted.

In FIG. 14, the output signal of the frequency error detector 16 is put in and amplified in the frequency error amplifier 211 by way of the frequency error input terminal 210. The output of the frequency error amplifier 211 is put into the third adder 209.

In the loop filter 13a, the integral system 1401 acting for correction of the frequency error is composed of a feedback loop formed of the integral system amplifier 202, frequency error amplifier 211, first adder 203, one-symbol delay unit 204, and third adder 209. The frequency error detected by the frequency error detector 16 is put into this integral system by way of the third adder 209. As the detected frequency error is integrated, it is transformed into a dimension of phase. On the other hand, the numerical control oscillator 14 is an oscillator of a type of advancing (or delaying) the output phase in proportion to the entered control signal. Therefore, in this configuration, the oscillation phase of the numerical control oscillator 14 can be controlled on the basis of the detected frequency error signal.

Thus, in the frequency error detector 16, the frequency error is detected by the phase error signal detected by the phase error detector 12a, and it is combined with the phase error signal detected by the phase error detector 12a in the loop filter 13a, and a control signal for the numerical control oscillator 14 is obtained, so that a greater frequency error can be compensated.

According to the carrier recovery apparatus in preferred embodiment 5 of the invention, phase error of quadrature modulation signal can be calculated by a simple calculation. As a result, the required circuit scale is smaller, and the frequency capture range can be further expanded.

Meanwhile, if the phase error detector 12a in the carrier recovery apparatus in preferred embodiment 5 of the invention shown in FIG. 11 is replaced by the phase error detector 12b in the carrier recovery apparatus in preferred embodiment 2 or the phase error detector 12d in the carrier recovery apparatus in preferred embodiment 4, the same effects are obviously obtained. In this case, when receiving the quadrature amplitude modulation (QAM) signals, the frequency capture characteristic and phase jitter characteristic are further improved.

Similarly, the phase error detector 12a in the carrier recovery apparatus in preferred embodiment 5 of the invention shown in FIG. 11 can be also replaced by the phase error detector 12c in the carrier recovery apparatus in preferred embodiment 3. In this case, however, the frequency error detector 16 must be replaced by the frequency error detector 16a shown in FIG. 13.

Figure 13:
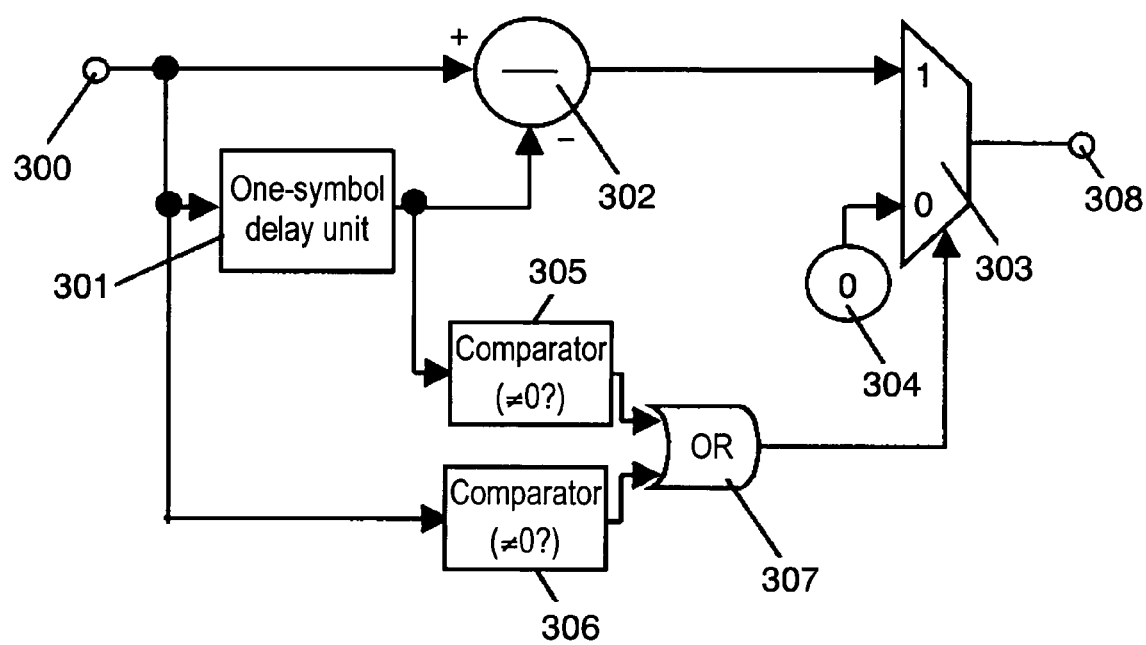
FIG. 13 is a block diagram showing an example of specific configuration of frequency error detector 16a in the carrier recovery apparatus in preferred embodiment 5 of the invention.

Referring to FIG. 13, the operation of the frequency error detector 16a is explained. FIG. 13 is a block diagram showing a specific configuration of the frequency error detector 16a. In FIG. 13, the frequency error detector 16a includes a phase error input terminal 300, a one-symbol delay unit 301, a subtractor 302, a frequency error output terminal 308, comparators 305, 306, an OR calculator 307, a selector 303, and a constant generator 304. The frequency error detector 16a is similar to the frequency error detector 16, except that the comparators 305, 306, OR calculator 307, selector 303 and constant generator 304 are further comprised. It is same as the frequency error detector 16 except for the comparators 305, 306, OR calculator 307, selector 303, and constant generator 304, and same parts are identified with same reference numerals and their explanation is omitted.

In FIG. 13, the phase error signal is supplied from the phase error detector 12c into the phase error input terminal 300. Only when the supplied phase error signal is judged to be appropriate as phase error signal, the detected phase error signal is supplied. That is, only when the received signal is present in the shaded area in FIG. 23 or FIG. 25, the detected phase error signal is supplied. If it is not judged to be appropriate, constant "0" is output from the phase error detector 12c.

FIG. 13 is configured so that the output of the phase error detector 12c when not appropriate is not used in the frequency error detection. The comparator 305 receives the output of the one-symbol delay unit 301, and compares and judges if each input signal is "0" or not. If the input signal is not "0", then "1" is output, or if "0", then "0" is output. The comparator 306 receives the output of the phase error detector 12c entered in the phase error input terminal 300, and compares and judges if each input signal is "0" or not. If the input signal is not "0", then "1" is output, or if "0", then "0" is output. The OR calculator 307 calculates the OR of the output of the comparator 305 and the output of the comparator 306. The output of the OR calculator 307 is put into the selector 303 as the control signal of the selector 303.

The subtractor 302 subtracts the output of the one-symbol delay unit 301 from the signal entered by way of the phase error input terminal 300. The selector 303 is controlled by the output of the OR calculator 307, and selects either one of the output of the subtractor 302 and the output of the constant generator 304. That is, only when neither the output of the phase error detector 12c delayed by one symbol nor the output of the present phase error detector 12c entered from the phase error input terminal 300 is "0", the selector 303 outputs the output of the subtractor 302 to the frequency error output terminal 308. Otherwise, the selector 303 outputs the constant "0" from the constant generator 304.

Thus, if the phase error detector 12a in the carrier recovery apparatus in preferred embodiment 5 of the invention shown in FIG. 11 is replaced by the phase error detector 12c in the carrier recovery apparatus in preferred embodiment 3, the same effects are obtained. In this case, in the reception status disturbed by noise or reflection, the frequency capture characteristic and phase jitter characteristic are further improved.

The foregoing explanation relates to embodiments of 4PSK and 16QAM, but same effects are obviously obtained by other phase shift keying (nPSK) or quadrature amplitude modulation (nQAM, etc.).

INDUSTRIAL APPLICABILITY

The carrier recovery apparatus of the invention recovers the carrier for demodulating digital-modulated signals such as quadrature amplitude modulation signals or phase shift keying signals.

The carrier recovery apparatus of the invention can detect the phase error of modulation signal by simple calculation, and can reduce the required scale of the circuit, and can inprove the frequency capture characteristic and the phase jitter characteristic.

The invention claimed is:

1. A carrier recovery apparatus comprising:
a numerical control oscillating means for outputting a complex oscillation signal;
a complex multiplying means for multiplying a modulated signal being input and an output of said numerical control oscillating means;
a phase error detecting means for detecting a phase error between the modulated signal and the complex oscillation signal on the basis of the output of said complex multiplying means; and
a loop filter for controlling said numerical control oscillating means by filtering the phase error,
wherein a carrier of the modulated signal is recovered by said numerical control oscillating means; and
wherein said phase error detecting means comprises:
a symbol estimating means for estimating a symbol on the basis of an output of said complex multiplying means;
a second complex multiplying means for multiplying an output of said symbol estimating means and an output of said complex multiplying means;
an imaginary number selecting means for selecting a Q signal axis component of an output of said second complex multiplying means;
a complex subtracting means for calculating an amplitude error by complex subtraction of the output of said complex multiplying means and the output of said symbol estimating means;
a phase error judging means for judging if the output of said second complex multiplying means is an error in phase direction or not on the basis of the amplitude error; and
a selecting means for outputting only the error in the phase direction out of an output of said imaginary number selector on the basis of an output of said phase error detecting means.

2. The carrier recovery apparatus of claim 1,
wherein said phase error judging means judges an error in the phase direction when a real number and an imaginary number of an output of said complex subtracting means are of different signs in case that a reception symbol is in the first quadrant or the third quadrant, and judges an error in the phase direction when the real number and imaginary number of the output of said complex subtracting means are of a same sign in case that the reception symbol is in the second quadrant or the fourth quadrant.

3. The carrier recovery apparatus of claim 1,
wherein said phase error judging means judges an error in the phase direction when a real number (Ei) and an imaginary number (Eq) of an output of said complex subtracting means are in the condition of $(-a-Ei) \leq Eq \leq (a-Ei)$ (where 0<a<minimum inter-code distance) in case that a reception symbol is in the first quadrant or the third quadrant, and judges an error in the phase direction when the real number (Ei) and the imaginary number (Eq) of the output of said complex subtracting means are in the condition of $(-a+Ei) \leq Eq \leq (a+Ei)$ (where 0<a<minimum inter-code distance) in case that the reception symbol is in the second quadrant or the fourth quadrant.

4. The carrier recovery apparatus of claim 1,
wherein said phase error detecting means further comprises an amplitude normalizing means for normalizing an output amplitude of said second complex multiplying means on the basis of an output of said symbol estimating means and outputting the phase error.

5. The carrier recovery apparatus of claim 1,
wherein said phase error detecting means further comprises an outermost symbol estimating means for estimating a reception symbol to be an outermost symbol and detecting the phase error when an absolute value of a real number or an imaginary number of an output of said complex multiplying means is larger than m times of the minimum inter-code distance d (however, $m=2^{(n-1)}$ when receiving $(2^{2n})$ QAM (n=2, 3, 4, . . . )).

6. The carrier recovery apparatus of claim 1,
wherein said phase error detecting means further comprises a frequency error detecting means for detecting a frequency error by detecting the change of the phase error in a symbol period on the basis of an output of said phase error detecting means; and
wherein an output of said frequency error detecting means is put into said loop filter.

7. A carrier recovery apparatus comprising:
a numerical control oscillating means for outputting a complex oscillation signal;
a complex multiplying means for multiplying an modulated signal being input and an output of said numerical control oscillating means;
a phase error detecting means for detecting a phase error between the modulated signal and the complex oscillation signal on the basis of an output of said complex multiplying means; and
a loop filter for controlling said numerical control oscillating means by filtering the phase error,
wherein a carrier of the modulation signal is recovered by said numerical control oscillating means; and
wherein said phase error detecting means includes:
a symbol estimating means for estimating a symbol on the basis of the output of said complex multiplying means;
a second complex multiplying means for multiplying an output of said symbol estimating means and the output of said complex multiplying means;
an imaginary number selecting means for selecting a Q signal axis component of an output of said second complex multiplying means; and
an amplitude normalizing means for normalizing an output amplitude of said second complex multiplying means on the basis of the output of symbol estimating means and outputting the phase error.

8. The carrier recovery apparatus of claim 7,
wherein said phase error detecting means further comprises an outermost symbol estimating means for estimating a reception symbol to be an outermost symbol and detecting the phase error when an absolute value of a real number or an imaginary number of an output of said complex multiplying means is larger than m times of the minimum inter-code distance d (however, m=2^(n−1) when receiving (2^2n) QAM (n=2, 3, 4, . . . )).

9. The carrier recovery apparatus of claim 7,
wherein said phase error detecting means further comprises a frequency error detecting means for detecting a frequency error by detecting the change of the phase error in a symbol period on the basis of an output of said phase error detecting means; and
wherein an output of said frequency error detecting means is put into said loop filter.

10. A carrier recovery apparatus comprising:
a numerical control oscillating means for outputting a complex oscillation signal;
a complex multiplying means for multiplying an modulated signal being input and an output of said numerical control oscillating means;
a phase error detecting means for detecting a phase error between the modulated signal and the complex oscillation signal on the basis of an output of said complex multiplying means; and
a loop filter for controlling said numerical control oscillating means by filtering the phase error,
wherein a carrier of the modulation signal is recovered by said numerical control oscillating means; and
wherein said phase error detecting means includes:
a symbol estimating means for estimating a symbol on the basis of the output of said complex multiplying means;
a first multiplying means for multiplying an I signal component of an output of said symbol estimating means and a Q signal component of the output of said complex multiplying means;
a second multiplying means for multiplying the Q signal component of the output of said symbol estimating means and the I signal component of the output of the complex multiplying means;
a subtracting means for subtracting an output of said first multiplying means and an output of said second multiplying means;
a complex subtracting means for calculating the amplitude error by complex subtraction of the output of said complex multiplying means and the output of said symbol estimating means;
a phase error judging means for judging if an output of said subtracting means is an error in phase direction or not on the basis of the amplitude error; and
a selecting means for outputting only the error in the phase direction out of the output of said subtracting means on the basis of an output of said phase error detecting means.

11. The carrier recovery apparatus of claim 10,
wherein said phase error judging means judges an error in the phase direction when a real number and an imaginary number of an output of said complex subtracting means are of different signs in case that a reception symbol is in the first quadrant or the third quadrant, and judges an error in the phase direction when the real number and imaginary number of the output of said complex subtracting means are of a same sign in case that the reception symbol is in the second quadrant or the fourth quadrant.

12. The carrier recovery apparatus of claim 10,
wherein said phase error judging means judges an error in the phase direction when a real number (Ei) and an imaginary number (Eq) of an output of said complex subtracting means are in the condition of $(-a-Ei) \leq Eq \leq (a-Ei)$ (where 0<a<minimum inter-code distance) in case that a reception symbol is in the first quadrant or the third quadrant, and judges an error in the phase direction when the real number (Ei) and the imaginary number (Eq) of the output of said complex subtracting means are in the condition of $(-a+Ei) \leq Eq \leq (a+Ei)$ (where 0<a<minimum inter-code distance) in case that the reception symbol is in the second quadrant or the fourth quadrant.

13. The carrier recovery apparatus of claim 10,
wherein said phase error detecting means further comprises an amplitude normalizing means for normalizing an output amplitude of said second complex multiplying means on the basis of an output of said symbol estimating means and outputting the phase error.

14. The carrier recovery apparatus of claim 10,
wherein said phase error detecting means further comprises an outermost symbol estimating means for estimating a reception symbol to be an outermost symbol and detecting the phase error when an absolute value of a real number or an imaginary number of an output of said complex multiplying means is larger than m times of the minimum inter-code distance d (however, m=2^(n−1) when receiving (2^2n) QAM (n=2, 3, 4, . . . )).

15. The carrier recovery apparatus of claim 10,
wherein said phase error detecting means further comprises a frequency error detecting means for detecting a frequency error by detecting the change of the phase error in a symbol period on the basis of an output of said phase error detecting means; and
wherein an output of said frequency error detecting means is put into said loop filter.

16. A carrier recovery apparatus comprising:
a numerical control oscillating means for outputting a complex oscillation signal;
a complex multiplying means for multiplying an modulated signal being input and an output of said numerical control oscillating means;
a phase error detecting means for detecting a phase error between the modulated signal and the complex oscillation signal on the basis of an output of said complex multiplying means; and
a loop filter for controlling said numerical control oscillating means by filtering the phase error,
wherein a carrier of the modulation signal is recovered by said numerical control oscillating means; and
wherein said phase error detecting means includes:
a symbol estimating means for estimating a symbol on the basis of the output of said complex multiplying means;
a first multiplying means for multiplying an I signal component of an output of said symbol estimating means and a Q signal component of the output of said complex multiplying means;
a second multiplying means for multiplying the Q signal component of the output of said symbol estimating means and the I signal component of the output of the complex multiplying means;
a subtracting means for subtracting an output of said first multiplying means and an output of said second multiplying means;
an amplitude normalizing means for normalizing an output amplitude of said subtracting means on the basis of the output of said symbol estimating means and outputting the phase error.

17. The carrier recovery apparatus of claim 16,
wherein said phase error detecting means further comprises an outermost symbol estimating means for estimating a reception symbol to be an outermost symbol and detecting the phase error when an absolute value of a real number or an imaginary number of an output of said complex multiplying means is larger than m times of the minimum inter-code distance d (however, $m=2^{(n-1)}$ when receiving $(2^{2n})$ QAM (n=2, 3, 4, . . . )).

18. The carrier recovery apparatus of claim 16,
wherein said phase error detecting means further comprises a frequency error detecting means for detecting a frequency error by detecting the change of the phase error in a symbol period on the basis of an output of said phase error detecting means; and
wherein an output of said frequency error detecting means is put into said loop filter.

* * * * *